(12) United States Patent
Williams et al.

(10) Patent No.: US 11,637,429 B2
(45) Date of Patent: Apr. 25, 2023

(54) ELECTRICAL POWER DISTRIBUTION NETWORK AND PROCESS

(71) Applicant: Third Equation Ltd., London (GB)

(72) Inventors: Matthew Williams, Victoria (AU); Andrew Scobie, Victoria (AU)

(73) Assignee: THIRD EQUATION LTD, London (GB)

( * ) Notice: Subject to any disclaimer, the term of this patent is extended or adjusted under 35 U.S.C. 154(b) by 0 days.

(21) Appl. No.: 16/988,401

(22) Filed: Aug. 7, 2020

(65) Prior Publication Data

US 2021/0175712 A1 Jun. 10, 2021

Related U.S. Application Data

(63) Continuation of application No. 16/309,405, filed as application No. PCT/AU2017/050997 on Sep. 14, 2017, now Pat. No. 10,742,035.

(30) Foreign Application Priority Data

Sep. 14, 2016 (AU) .................. 2016903692

(51) Int. Cl.
 *H02J 3/28* (2006.01)
 *H01F 29/14* (2006.01)
 (Continued)

(52) U.S. Cl.
 CPC ............... *H02J 3/28* (2013.01); *G05F 1/325* (2013.01); *G05F 1/33* (2013.01); *G05F 1/335* (2013.01);
 (Continued)

(58) Field of Classification Search
 CPC ........ H02J 3/28; H02J 1/14; H02J 3/01; H02J 3/18; G05F 1/325; G05F 1/33;
 (Continued)

(56) References Cited

U.S. PATENT DOCUMENTS 2,913,596 A 11/1959 Ogle
4,641,232 A 2/1987 Pitel
(Continued)

FOREIGN PATENT DOCUMENTS

CN 205 489 568 8/2016
GB 1 532 037 11/1978

OTHER PUBLICATIONS

Extended European Search Report in European Application No. 178499212.6 dated Nov. 11, 2018 in 20 pages.
International Search Report dated Nov. 15, 2017 for International Application No. PCT/AU2017/050997, 5 pages.
Written Opinion of the International Searching Authority dated Nov. 15, 2017 for International Application No. PCT/AU2017/050997, 5 pages.

*Primary Examiner* — Daniel Kessie
*Assistant Examiner* — Brian K Baxter
(74) *Attorney, Agent, or Firm* — Knobbe, Martens, Olson & Bear, LLP

(57) ABSTRACT

An electrical power distribution network includes: a plurality of electrical power control apparatuses, each of which include one or more signal conversion components receiving electrical power in the form of a first signal and generating a corresponding second signal, a controller that controls operation of the signal conversion components, electrical power generation components acting as sources of electrical power to at least some of the electrical power control apparatuses, and electrical power consumption components acting as sinks of electrical power from at least some of the electrical power control apparatuses. The electrical power control apparatuses operate autonomously but are interconnected so that the electrical power control apparatuses collectively maintain the voltages and frequencies of electrical power signals flowing through the electrical power distribution network at target values to compensate for variations in the sinks and/or sources of electrical power.

16 Claims, 27 Drawing Sheets

(51) Int. Cl.
  *H02J 3/01* (2006.01)
  *H02J 3/18* (2006.01)
  *H02M 5/10* (2006.01)
  *H02M 5/27* (2006.01)
  *G05F 1/335* (2006.01)
  *H02J 1/14* (2006.01)
  *H02M 5/16* (2006.01)
  *H02M 5/04* (2006.01)
  *G05F 1/325* (2006.01)
  *G05F 1/33* (2006.01)
  *H01F 38/04* (2006.01)
  *H02M 5/451* (2006.01)
  *H02M 5/297* (2006.01)
  *H02M 5/42* (2006.01)

(52) U.S. Cl.
  CPC ............ *H01F 29/14* (2013.01); *H01F 38/04* (2013.01); *H02J 1/14* (2013.01); *H02J 3/01* (2013.01); *H02J 3/18* (2013.01); *H02M 5/04* (2013.01); *H02M 5/10* (2013.01); *H02M 5/16* (2013.01); *H02M 5/27* (2013.01); *H02M 5/297* (2013.01); *H02M 5/42* (2013.01); *H02M 5/451* (2013.01); *H01F 2029/143* (2013.01)

(58) Field of Classification Search
  CPC .......... G05F 1/335; H01F 29/14; H01F 38/04; H01F 2029/143; H02M 5/04; H02M 5/10; H02M 5/16; H02M 5/27; H02M 5/297; H02M 5/42; H02M 5/451
  See application file for complete search history.

(56) References Cited

U.S. PATENT DOCUMENTS

| | | | |
|---|---|---|---|
| 4,800,481 A * | 1/1989 | Knaffl | H02M 7/49 363/54 |
| 5,414,609 A | 5/1995 | Levran et al. | |
| 5,521,811 A | 5/1996 | Levran et al. | |
| 5,592,137 A | 1/1997 | Levran et al. | |
| 5,982,645 A | 11/1999 | Levran et al. | |
| 8,860,335 B2 | 10/2014 | Gries et al. | |
| 9,722,503 B2 | 8/2017 | Ledezma et al. | |
| 10,298,021 B2 * | 5/2019 | Bamberger | H02J 3/28 |
| 10,474,171 B2 | 11/2019 | Williams et al. | |
| 10,742,035 B2 | 8/2020 | Williams et al. | |
| 10,809,678 B2 * | 10/2020 | Nasirian | H02J 13/00 |
| 2003/0117251 A1 | 6/2003 | Haugs et al. | |
| 2005/0110605 A1 | 5/2005 | Haugs et al. | |
| 2005/0190585 A1 | 9/2005 | Haugs et al. | |
| 2007/0114796 A1 * | 5/2007 | Garces | H02J 3/28 290/43 |
| 2013/0051091 A1 | 2/2013 | Datta et al. | |
| 2013/0119901 A1 | 5/2013 | Gries et al. | |
| 2013/0320940 A1 * | 12/2013 | Dimitrovski | G05F 1/32 323/249 |
| 2014/0293663 A1 | 10/2014 | Ledezma et al. | |
| 2014/0327308 A1 | 11/2014 | Cargile et al. | |
| 2015/0325998 A1 | 11/2015 | Jouper | |
| 2015/0326134 A1 | 11/2015 | Jouper | |
| 2017/0207622 A1 | 7/2017 | Jouper et al. | |
| 2019/0369651 A1 | 12/2019 | Williams et al. | |

* cited by examiner

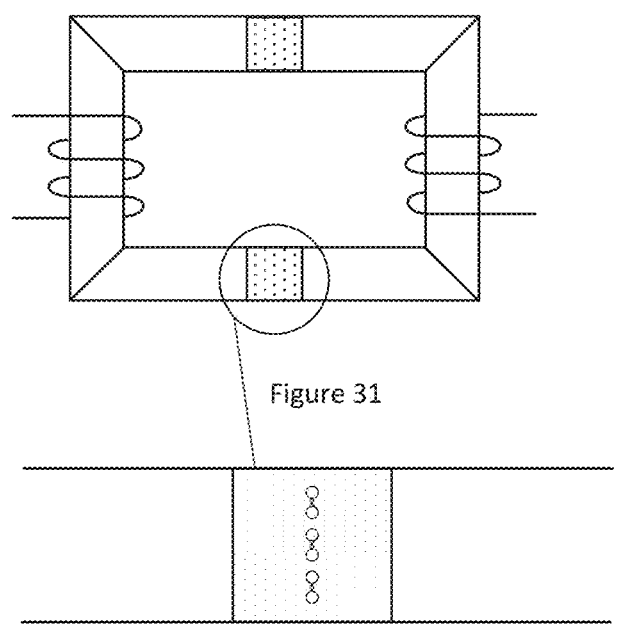
Figure 31
Figure 32
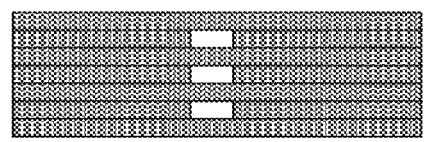
Figure 33
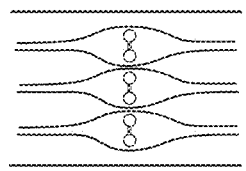
Figure 34

ELECTRICAL POWER DISTRIBUTION NETWORK AND PROCESS

TECHNICAL FIELD

The present invention relates to electrical energy supply, and in particular to an electrical power distribution network and process.

BACKGROUND

The Global Energy Problem

The ability to harness the stored energy of fossil fuels in the form of electricity has enabled humans to make amazing advances toward our wellbeing. However, as the global demand for electricity continues to increase, it is widely anticipated that the resulting impact on the environment will ultimately reach a point where it becomes a threat to our survival. Therefore, resolving the constraints to universal access to electricity without unsustainable environmental consequence is a social and economic priority of the highest order.

To meet the legitimate aspirations of the world's population and impact poverty, the US Energy Information Administration estimates an increase of over 50% in global energy requirements by 2040 (Reference: International Energy Outlook 2016). At the same time, a significant decrease in environmental impact and cost of energy is required. Our traditional power generation methods use fossil fuels that are all constrained resources. At present, our only proven clean generation options are hydro, geothermal, biomass, solar and wind. Of these, solar and wind present the best opportunity to meet our future needs, as the others have very specific geographic inputs and requirements.

The global consensus of policymakers is that we need to dramatically increase our clean energy generation, as evidenced by the recent Paris Climate or COP21 agreement. However, with our current and forecast advances in clean generation technology, the design of our electricity networks is incapable of allowing us to achieve the mandated goals. In particular, integration is a well-known and unsolved issue.

Electricity System Overview

The entire electricity supply chain can be generally grouped into three areas: generation, distribution, and consumption. In order to maintain a reliable power supply, energy generation is controlled to meet consumption through an end-to-end network.

Electricity distribution networks are the largest manmade objects ever created. To date, they have all been conceived and constructed for very specific operating conditions under a single design schematic. The design schematic is relatively simple: generation in the past was easily and adequately equilibrated with consumption. A small number of dispatchable generation sources supplied a series of tranched or grouped consumers. The topology of electrical networks tends to be a mixture of radial (a single large generator with consumers progressively tranched in a tree structure around it), and more complex and redundant path network topologies such as mesh and ring topologies. These topologies are designed to provide a good balance of reliability and cost based on the network demands of a few large stable and dispatchable generators and many consumers.

At present, the vast majority of electricity generation is directly controllable as it is produced from fossil fuels. The table below outlines the current makeup of electricity generation for the US and UK.

TABLE 1

| Percentage of Total Electricity Generation by Source (2015) | | | | | |
|---|---|---|---|---|---|
| US | 33% | 33% | 20% | 8% | 5% |
| UK | 23% | 30% | 21% | 11% | 14% |

As the level of variable renewable energy generation increases, our ability to control the supply of electricity to match demand becomes increasingly difficult. If this balance of supply and demand is not maintained, the stability and availability of electricity is threatened.

As the makeup of generation is changing toward more renewable energy, the characteristics of the electricity supply are changing, both the physical architecture of the network and our ability to control generation levels. This causes increasing issues of stability and efficiency, with the threshold capability of current electricity network architecture falling far short of required levels to meet our climate change targets. Attempting to resolve the situation through control of generation and/or consumption alone has intolerable social, economic and environmental effects. The configuration of the electricity distribution network needs to adapt if our electricity supply chain is to remain viable and deliver on our social and economic intentions.

Electricity System Balancing Requirement

Maintaining a reliable electricity supply requires the voltage and frequency of the grid to be maintained within a narrow band of about +/−1%. Other than the limited storage options currently available, electricity must be consumed when it is generated, and consequently supply and demand must be balanced to maintain the required target voltage and frequency. Until now, this has been accomplished by monitoring the grid at a coarse high level, and then adjusting the output of controllable generation sources that are largely fossil fuel, nuclear or hydro-electric.

Balancing of the grid can be categorised into three response times:

Long Term (days to weeks)
Medium Term (hours)
Short Term (milliseconds to minutes)

The UN report 'Global Trends in Renewable Energy Investment 2016' states there are currently four potential balancing options, with an unacceptable fifth currently also being utilised globally.

In the case where demand exceeds supply:
i. Increasing the amount of faster responding conventional generation i.e. gas, coal or diesel;
ii. Interconnectors to transport electricity from one grid to another; and
iii. Demand response by paying larger industrial and commercial consumers to reduce usage when supply is falling short of demand.

In the case where supply exceeds demand:
iv. Energy storage to store excess electricity when it is available and release it back into the grid when required; and
v. Curtailment of renewable energy generation to directly reduce supply A combination of these solutions in parallel would be plausible to attempt to manage the long and medium term balancing of grids. Currently, each option either has prohibitive costs, unacceptable consequences, or both.

For the short term response (milliseconds to minutes) of balancing of our grids, none of these options will successfully allow the increased penetration and consumption of renewable generation whilst maintaining a reliable power supply, for at least the reasons discussed below.

Short Term Grid Balancing Issues

The following outlines the issues that must be overcome in relation to renewable energy integration into the grid.

System Frequency

All generators inject power into our grid as alternating current (AC), and are synchronised to operate at the same frequency and phase. The amount of power injected by each generator is balanced through the ratio of its power output rating compared to all other generators injecting power into the system in order to evenly distribute the load. This occurs naturally unless modified by operator control.

Traditional fossil fuels, nuclear and even hydro power are all synchronous generators which introduce inertia to help maintain this frequency, and are controllable, providing frequency response and stability. They remain synchronised due to the self-regulating properties of their interconnection. If one generator deviates from its synchronous speed, power is transferred from the other generators in the system in such a way as to reduce the speed deviation. The stored inertial energy of the generators provides a short-term counteraction to frequency change, with governors taking over after a few seconds.

In contrast, wind and Solar Generation use significantly different technologies, producing DC power and injecting it into the AC grid through converters. This means that they are decoupled from the grid frequency, and results in asynchronous operation with no inertial energy to contribute. It is possible for converters equipped with governor-like controls to respond to frequency drops, however this cannot occur fast enough to adequately compensate and maintain grid stability. It can also only occur when the generation source is operating in a curtailed condition.

Grid Architecture

Our electricity grids have been specifically designed to deliver a reliable electricity supply from power sources through a transmission network over a long distance to load centres on a distribution network. The entire ontology of our grids is changing due to the local and dispersed nature of renewable energy generation. Our current grid hardware is incapable of adequately distributing these new power sources bi-directionally and both vertically and horizontally through the network, causing a myriad of power engineering problems, including a reduction in the capacity of the network.

Current methods for addressing these issues primarily involve additional hardware and software systems to mitigate undesired effects. These technologies are generally accepted as increasing network fragility and cost without addressing the root cause.

Control

Renewable energies such as wind and solar are not dispatchable like traditional fossil fuels, nuclear or hydro power. As we do not have control over the energy input (i.e. the wind or the sun), we are unable to ramp up or down as required to balance the system, or maintain a steady state of output. We can only actively manage the output to maintain the required power level through storage solutions or by curtailing the generation. However, curtailment is pure waste.

Variability

The rate at which the power output of renewable energies such as wind and solar can change is much faster than traditional generation technology. This occurs in two major forms:

Intermittence—renewable energy sources have long periods of unavailability due to input requirements outside of direct control (i.e. sunlight and wind).

Volatility—at all times constant variation in the output from renewable energy generation is occurring. The two main constituents of this are the rapid rate of change of output generation, and the noise inherent to the output signal.

The law of averages helps in part to mitigate the instantaneous effects of volatility with the vast number of solar and wind generation sources. However, maintaining voltage and frequency in the short term (milliseconds to seconds) remains a significant unresolved challenge. Currently available responsive dispatchable generation technology is still significantly slower to react than the rate of change introduced by volatile renewable generation. There is no current solution to this issue.

Efficiency

Electricity grids are designed to work at a specific operating point, with a narrow band of operation due to consumption requirements. When the voltage or frequency deviates from the optimal point, the efficiency of the grid and its devices decreases, resulting in greater energy losses. Energy losses in developed grids are 5%-10%, with up to half of this loss due to non-fixed inefficiency losses. When the voltage or frequency goes outside the set operating boundaries, system protection actions are automatically undertaken which leads to both brown outs and black outs for hardware protection and safety.

Network Hardware

Electric power networks around the world use predominantly AC (alternating current) transmission and distribution. DC (direct current) is typically only used for high capacity and long distance interconnectors between separate networks (e.g. undersea cable connections). Network voltages (and sometimes frequency) must be altered at different locations to minimise transmission and distribution losses, and deliver power to consumers at manageable levels. These voltages and the resulting power flows are managed with the following devices which are designed to operate most efficiently at a fixed maximum capacity with minimum variations in demand or supply:

Circuit Breakers

Allows substations to be disconnected from the transmission network or for distribution lines to be disconnected.

Transformers

These are used for most voltage conversion duties in AC electrical power networks. Transformers are passive devices; they operate using simple electromagnetic circuit principles without any active modulation or switching schemes. Simple tap-changers are used on some transformers to regulate network voltage in discrete steps within relatively narrow ranges according to varying demand. Transformers can also transfer power bi-directionally depending upon the balance of generation and load on each side of the device.

Rectifiers

These perform direct conversion from AC to DC electrical power using semiconductor diodes or similar devices. These are also passive systems in the sense that there is no inherent switching or control capability built into their design. Large scale rectifiers are used for HV DC transmission.

Frequency Converters

These are more sophisticated devices which use active high-speed electronic switching of the mains supply to deliver frequency conversion between two different parts of the network. They range in size from small domestic network-connected solar panel inverters up to long distance HV DC to AC converters.

Power Correction Devices

There are a number of devices with the sole purpose of undertaking corrective actions on the power in the system to maintain a steady and clean power supply for use. This group of devices include but are not limited to filters, capacitors, and inductors.

Network Limitation

Increasing penetration of variable and non-dispatchable electricity generation sources (i.e. renewable energy sources such as wind and solar) are changing both the physical architecture of the network and our ability to control generation levels. This causes increasing issues of stability and efficiency, with the threshold capability of current electricity network architecture falling far short of required levels.

A New Approach to Existing Electricity Networks

It is unanimously agreed that our current electricity transmission and distribution networks are unable to provide a usable power supply above a certain threshold penetration of clean energy from wind and solar. This threshold point varies for each network based on physical architecture, generation and load profiles, as well as a myriad of other factors.

The design architecture and technology that our electricity networks use has significantly improved in cost and efficiency over the last 120 years. Yet it still utilises the same fundamental technology and design architecture that were established in the 19th Century.

One of the fundamental underpinnings of the entire electricity system, the transformer, is a passive device that is unable to effectively deal with the variability that is being imposed on its operations. For example, a transformer is exceedingly efficient at its designed operating point, but its efficiency deteriorates rapidly away from this point. A device with the capability to accept a much wider range of operating conditions with efficiency is required. The added ability to actively control operations and affect power flow through the system allows further stability and security to be delivered. This requirement is further exacerbated by the geographic distribution of new variable renewable generation being added to the existing rigid system.

All currently proposed options to upgrade our networks rely on existing operating methodologies, technologies and systems. In the case of energy storage, the technology to make this economically feasible has not yet been invented. All these options add significant cost, complexity and fragility into the network and reduce its efficiency.

It is desired to alleviate one or more difficulties of the prior art, or to at least provide a useful alternative.

SUMMARY

In accordance with some embodiments of the present invention, there is provided an electrical power distribution network, including:
  a plurality of electrical power control apparatuses, each of the electrical power control apparatuses including:
    one or more signal conversion components receiving electrical power in the form of a corresponding first signal having a corresponding first fundamental frequency and a corresponding first characteristic voltage, and generating a corresponding second signal having a corresponding second fundamental frequency and a corresponding second characteristic voltage; and
    a controller that controls operation of the signal conversion components to determine an output voltage and an output frequency of an output signal of the electrical power control apparatus;
  electrical power generation components acting as sources of electrical power to at least some of the electrical power control apparatuses; and
  electrical power consumption components acting as sinks of electrical power from at least some of the electrical power control apparatuses;
  wherein the electrical power control apparatuses operate autonomously but are interconnected such that an output of each of the electrical power control apparatuses is connected to an input of at least one corresponding other of the electrical power control apparatuses and to one or more of the sinks and/or sources of electrical power so that the electrical power control apparatuses collectively maintain the voltages and frequencies of electrical power signals flowing through the electrical power distribution network at target values to compensate for variations in the sinks and/or sources of electrical power.

In some embodiments, each of the electrical power control apparatuses includes one or more energy storage components storing electrical energy, and uses its energy storage components to store electrical energy when it receives more electrical power than is required at its output, and releases stored electrical energy from its energy storage components when it receives less electrical power than is required at its output, and provides corresponding output electrical power in the form of a corresponding output signal having a target output frequency and a target output voltage.

In accordance with some embodiments of the present invention, there is provided an electrical power distribution network, including:
  a plurality of electrical power control apparatuses, each of the electrical power control apparatuses including:
    one or more signal conversion components receiving electrical power in the form of a corresponding first signal having a corresponding first fundamental frequency and a corresponding first characteristic voltage, and generating a corresponding second signal having a corresponding second fundamental frequency and a corresponding second characteristic voltage;
    one or more energy storage components storing electrical energy; and
    a controller controlling operation of the signal conversion components and the energy storage components;
  electrical power generation components acting as sources of electrical power to at least some of the electrical power control apparatuses; and
  electrical power consumption components acting as sinks of electrical power from at least some of the electrical power control apparatuses;
  wherein the electrical power control apparatuses are interconnected and operate autonomously such that each electrical power control apparatus uses its energy storage components to store electrical energy when it receives more electrical power than is required at its output, and releases stored electrical energy from its energy storage components when it receives less electrical power than is required at its output, and provides corresponding output electrical power in the form of a corresponding output signal having a target output frequency and a target output voltage.

In some embodiments, each of the electrical power control apparatuses includes:
- at least one virtual air gap transformer, including at least one primary winding, at least one secondary winding, and at least one control winding to control the electromagnetic coupling between the primary and secondary windings;
- a heterodyning component configured to receive a signal having a first fundamental frequency and to generate a corresponding heterodyned signal having frequency components corresponding to a sum and a difference of the first fundamental frequency and a reference frequency;
- a filtering component configured to filter a heterodyned signal to remove one of the sum and the difference frequency components therefrom and provide a corresponding filtered signal;
- an input port configured to receive a first input signal having a first input fundamental frequency and a first voltage; and
- a controller configured to:
  - (i) receive a signal representing at least the first fundamental frequency of the first input signal and to generate a corresponding frequency control signal to determine the reference frequency of the heterodyning component such that the filtered signal has a target output frequency; and
  - (ii) receive a signal representing the first voltage, and to generate a corresponding virtual air gap control signal to determine the electrical current in the control windings of the at least one virtual air gap transformer, such that a target output voltage is generated at the secondary windings.

In some embodiments, the control component is configured to control the electrical current in the control windings of the at least one virtual air gap transformer to improve the power factor of the electrical power control apparatus.

In some embodiments, the control component includes a field-programmable gate array (FPGA) or other form of processor configured to implement:
- a phase-locked loop (PLL) to determine a phase of the corresponding first signal;
- at least one Park transform component to generate park transforms representations of voltage and current of the first signal based on the phase determined by the PLL;
- a reactive power estimation component configured to process the voltage and current of the first signal to generate an estimate of reactive power; and
- one or more power factor control components configured to process the estimate of reactive power to control the electrical current in the control windings of the at least one virtual air gap transformer to improve the power factor of the electrical power control apparatus.

In some embodiments, each of the electrical power control apparatuses is configured for bi-directional use such that the apparatus receives second input electrical energy in the form of a second input signal having a second input fundamental frequency and a second input voltage, and generates corresponding output electrical energy in the form of a corresponding second output signal of a second target frequency and a second target output voltage, wherein the second input signal or a corresponding signal derived from the second input signal is applied to the secondary winding of the at least one virtual air gap transformer to generate a corresponding signal having the second target output voltage at the primary winding of the virtual air gap transformer.

In some embodiments, the second input signal or a corresponding signal derived from the second input signal is received by the heterodyning component to generate a corresponding second heterodyned signal having second frequency components corresponding to a sum and a difference of the second fundamental frequency and a reference frequency, and the filtering component is configured to filter the second heterodyned signal to remove one of the sum and the difference frequency components therefrom and provide a corresponding second filtered signal.

In some embodiments, the heterodyning component is a first heterodyning component, the filtering component is a first filtering component, and the system includes a second heterodyning component and a second filtering component, wherein the first heterodyning component and the first filtering component are configured to process signals flowing through the apparatus along a first pathway, and the second heterodyning component and the second filtering component are configured to process signals flowing through the apparatus along a second pathway generally opposite in sense to the first pathway.

In some embodiments, the heterodyning component is a first heterodyning component, the filtering component is a first filtering component, and the apparatus includes a second heterodyning component and a second filtering component, wherein the heterodyning components and the filtering components are configured such that the first signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

In some embodiments, the at least one virtual air gap transformer includes two virtual air gap transformers connected in series by at least one loop configured to store energy.

In accordance with some embodiments of the present invention, there is provided an electrical power distribution process executed by each of the electrical power control apparatuses of any one of the above processes, the process including:
- receiving electrical power in the form of a corresponding first signal having a corresponding first fundamental frequency and a corresponding first characteristic voltage, the electrical power representing an output of at least one other of the electrical power control apparatuses as modified by one or more of the sinks and/or sources of electrical power;
- controlling the one or more signal conversion components so that the electrical power control apparatus provides output electrical energy in the form of a corresponding output signal having corresponding target values of voltage and frequency.

In some embodiments, the electrical power distribution process includes:
- storing electrical energy in one or more corresponding energy storage components when the electrical power control apparatus receives more electrical power than is required at its output;
- releasing stored electrical energy from the one or more corresponding energy storage components when the electrical power control apparatus receives less electrical power than is required at its output; and providing corresponding output electrical power in the form of a corresponding output signal having a target output frequency and a target output voltage.

In some embodiments, the electrical power distribution process includes controlling the one or more signal conversion components to improve the power factor of the electrical power control apparatus.

In some embodiments, the electrical power distribution process includes:

measuring an output voltage on a secondary winding of a variable air-gap transformer of the electrical power control apparatus;

applying a Park transform of the measured voltage to generate direct and quadrature components of the measured voltage;

comparing the direct component to the target voltage value;

using a proportional-integral control loop to generate a control signal;

applying an inverse Park transform to the control signal to generate a transformed control signal; and based on a comparison of the transformed control signal and electrical current in the control windings of at least one virtual air gap transformer, adjusting the electrical current in the control windings to improve the power factor of the electrical power control apparatus.

BRIEF DESCRIPTION OF THE DRAWINGS

Some embodiments of the present invention will now be described, by way of example only, with reference to the accompanying figures, wherein:

FIG. 31 is a schematic illustration of a single phase core type transformer constructed of four sections, with two sections housing the primary and secondary windings, and the other two sections having three subsections, with a different material making up the middle subsection;

FIG. 32 is a schematic illustration of a virtual air gap consisting of 6 holes in a vertical configuration, with three individual control winding loops;

FIG. 33 is a schematic illustration of a standard laminate stacking process for transformers, with breaks in some laminates, which with the use of spacers will allow holes for the control winding within the core without the need for drilling;

FIG. 34 is a schematic illustration of the altered flux path within a magnetic core due to a current being applied to the control windings;

DETAILED DESCRIPTION

Embodiments of the present invention include an electrical power distribution network and process. The electrical power distribution network includes electrical power control apparatuses that are typically distributed throughout the network and that collectively maintain the corresponding voltages and frequencies of electrical power signals flowing through the electrical power distribution network at corresponding target values to compensate for variations in the sinks and/or sources of electrical power, including the variability of renewable energy sources such as wind and solar power, for example. In this manner, the electrical power distribution network and process address the shortcomings of the prior art described above. The electrical power control apparatuses on which the network is based are described below, followed by a description of how these apparatuses are interconnected to form the electrical power distribution networks described herein and realise their many advantages.

Electrical Power Control Apparatus

Embodiments of the present invention include instances of an electrical power control apparatus, each of which receives input electrical energy in the form of an input signal having some frequency and voltage, and converts that input electrical energy to output electrical energy in the form of an output signal having a corresponding desired or 'target' frequency and a corresponding desired or 'target' output voltage. The input electrical energy will typically vary over time (that is, its frequency and/or voltage is time-dependent), and thus the system and process operate to dynamically control the conversion so that the output electrical energy has the desired target frequency and target voltage, which themselves may also vary over time.

The electrical power control apparatuses are able to provide frequency and voltage conversion while simultaneously providing power factor correction, utilising high-speed electromagnetic path switching instead of electronic circuit switching to deliver improved efficiency and regulation (as well as electrically isolating the two systems).

In this specification, unless the context indicates otherwise, the term "signal" is used for convenience of reference, and is to be construed broadly as referring to a form of electrical energy characterised by a voltage and at least one fundamental frequency (which could be zero in the case of a DC voltage), and does not necessarily require that any form of information is represented by or conveyed by the signal, notwithstanding that some embodiments of the invention may involve the communication of information encoded in the signal.

Figure 1:
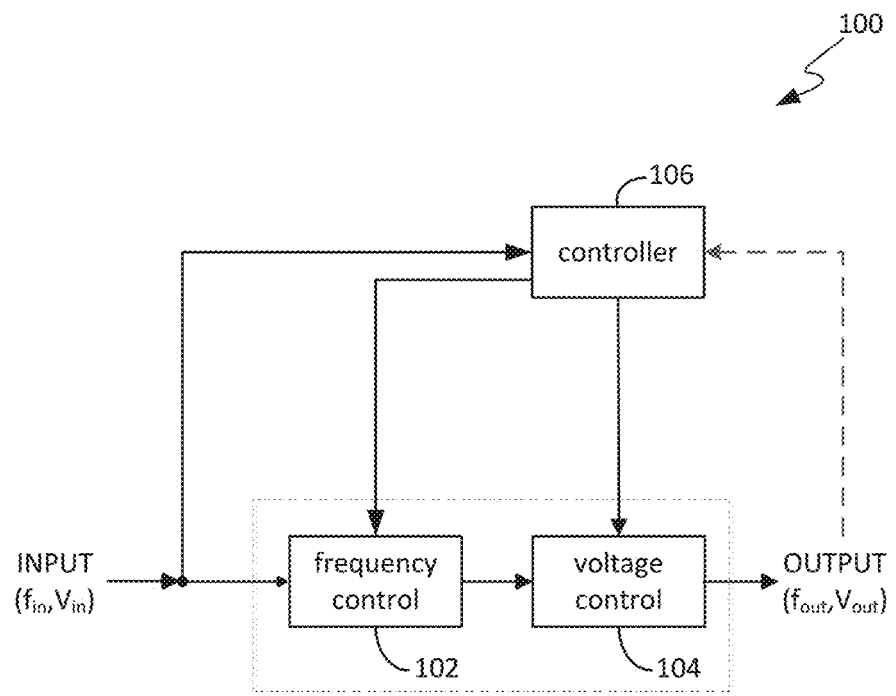
FIG. 1 is a block diagram of an electrical energy supply system in accordance with some embodiments of the present invention.

As shown in FIG. 1, an electrical power control apparatus 100 includes a frequency control component 102, a voltage control component 104, and a controller 106. As described above, the frequency control component 102 receives an input signal of some characteristic input frequency, and provides a corresponding output signal having a selected or desired output frequency, regardless of the input frequency. Similarly, the voltage control component 104 receives an input signal of some characteristic input voltage, and provides a corresponding output signal having a selected or desired output voltage, regardless of the input voltage. In combination, the frequency control component 102 and the voltage control component 104 act in concert so that the system 100 receives an input signal having some (typically time-varying) characteristic frequency $f_{in}$ and voltage $V_{in}$, and generates a corresponding output signal having a selected frequency $f_{out}$ and a selected voltage $V_{out}$. In particular, the electrical power control apparatus 100 is used as part of a mains electricity distribution network, the system 100 can be configured so that the output frequency $f_{out}$ is constant and equal to the appropriate mains electricity frequency of 50 Hz or 60 Hz, and the output voltage is dynamically adjusted to match the electrical load on the system 100. Deviation from the nominal mains frequency is a major source of losses within an electricity grid.

The controller 106 uses step down devices (e.g., buck converters in the described embodiments) to monitor the input frequency and voltage and generates corresponding frequency and voltage control signals that are respectively used to control the operation of the frequency control component 102 and the voltage control component 104.

As known by those skilled in the art, a transformer is an electromagnetic device that transfers electric energy from one circuit to another circuit via mutual inductance, and is typically made up of a primary winding, a magnetic core and a secondary winding. When an alternating voltage is applied to the primary winding, an alternating current flows through the primary winding. This magnetizing current produces an alternating magnetic flux. The flux is mostly constrained within the magnetic core, and induces voltage in the linked secondary winding, which if connected to an electrical load produces an alternating current. This secondary load current then produces its own alternating magnetic flux which links back with the primary winding.

The secondary voltage is determined by the product of the primary voltage and the ratio of the number of turns in the secondary winding and the number of turns in the primary winding. Transformers are commonly used to convert between high and low voltages, but they are bulky by necessity at distribution frequencies. They offer high efficiency, simplicity of design, and bidirectional power transfer. However their passive nature affords limited regulation of the power transferred, requiring the introduction of inefficient power factor control and voltage regulation. The physics of operation at mains supply frequencies also makes them comparatively large for a given power rating, increasing costs of materials, fabrication and insulation management.

Voltage Conversion

Figure 2:
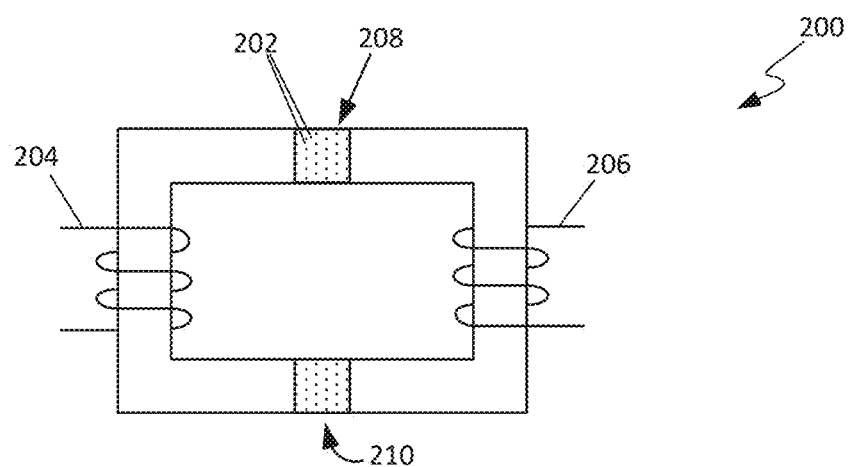
FIG. 2 is a schematic illustration of a virtual air-gap transformer (VAGT) of an electrical energy supply system in accordance with some embodiments of the present invention, in this example consisting of a single phase core type transformer with virtual air gaps in the flux path, with energy stored as magnetic field energy primarily within the air gaps.
Figure 3:
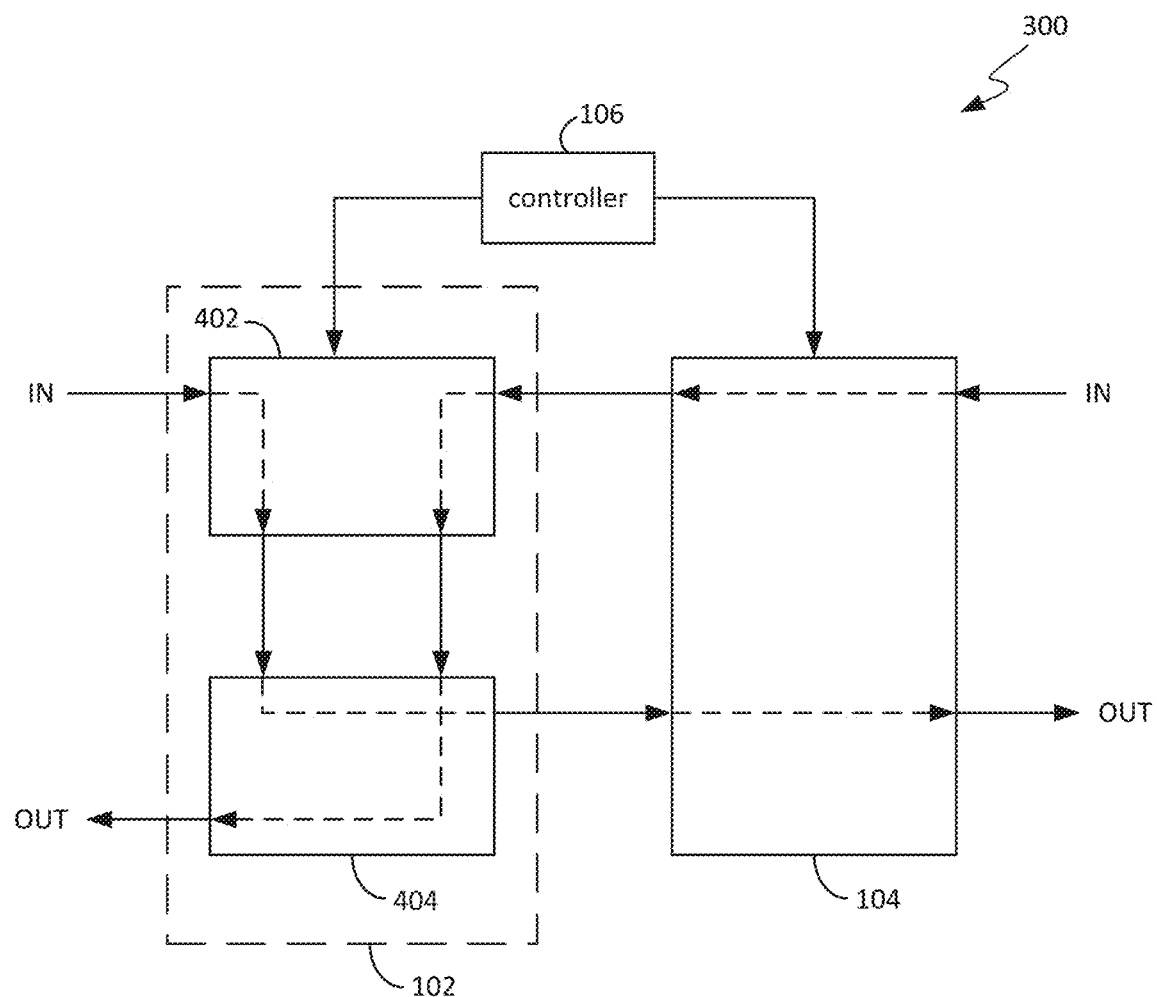
FIG. 3 is a block diagram showing bi-directional flow of electrical energy through the VAGT and a heterodyning component and a filtering component of an implementation of an electrical energy supply system.

Voltage conversion is achieved by providing the voltage control component 104 in the form of a transformer configuration referred to herein as a 'virtual air-gap transformer' or 'VAGT' 200, as shown in FIG. 2, in which at least one control winding 202 is disposed in the magnetic flux path between the primary winding 204 and the secondary winding 206 of the transformer to controllably saturate a local region 208 of the magnetic core, and thereby control the electromagnetic coupling between the primary 204 and secondary 206 windings, and thus determine the voltage generated across the secondary winding 206. The effect of saturating a local region 208 of the magnetic flux path is equivalent to the effect of a physical airgap in the magnetic flux path, with the size of the saturated region 208 (and thus the equivalent ('virtual') airgap 208) at any time being determined by the electrical current flowing through the control winding 202 at that time. This control current through the control winding 202 can be either DC or AC, as determined by the specific requirements of each implementation, with each current type providing different characteristics and complexity. For example, DC current is used for simplicity of control, whereas AC current is used for more complex control and provides lower electrical leakage losses.

In addition to the various control current implementations, some implementations of the device can apply a short circuit to the control winding 202, or to some of the control windings when multiple windings are implemented. During the short circuit application, the control winding affects the magnetic core flux in such a way to resist any change to the state of the system at that point. Utilising this phenomenon at localised points within the magnetic core, and magnetic core cross section, the flux path can be altered and saturated.

By dynamically monitoring the input voltage across the primary winding 204 and knowing the relationship between secondary and primary winding voltages as a function of the current flowing through the control winding 202, the current flowing through the control winding 202 can be dynamically adjusted to provide a selected or desired voltage across the secondary winding 206.

Additionally, in some implementations of the device, the voltage is measured across the secondary winding 206 as well as the voltage across primary winding 204. In some implementations of the device, the voltage and frequency is measured on either the primary winding, secondary winding, or both.

Figure 28:
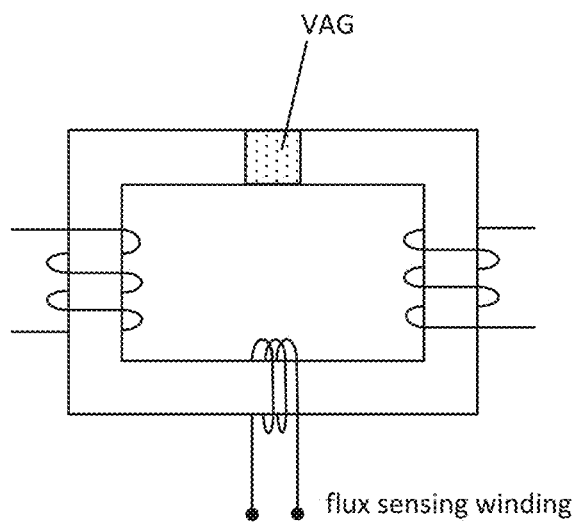
FIG. 28 is a schematic illustration of a single phase core type virtual air gap transformer, with a flux sensing winding to measure the core flux.

In some configurations of the device, the flux through the core of the VAGT is measured. The magnetic flux is relative to the electrical power flowing through the device, and is the force that is being controlled by changing the reluctance of the magnetic circuit using the control winding. Depending on the specific requirements of the implementation, the flux is measured by Hall Effect sensors (such as http://uk.rs-online.com/web/c/automation-control-gear/sensors-transducers/hall-effect-sensors/) or a winding around the magnetic core as shown in FIG. 28. It will be apparent for those skilled in the art that any of a number of known configurations and sensing methods can be used to achieve this measurement.

In a magnetic circuit driven by an AC flux source, the main magnetic flux (Φm) is determined by the driving voltage (Φm=∫ vdt). The flux density within the core has a reluctance which can be calculated as:

$$R_m = \frac{\ell}{\mu_0 \mu_r A_c}$$

where $\ell$ is the magnetic path length, $A_c$ is the core cross sectional area, and $\mu_0 \mu_r$ is the core permeability.

The magnetomotive force (mmf) in the core is a function of the flux and the reluctance. Changes in the reluctance of the core due to changes in the virtual air gap produce corresponding changes in the mmf, which in turn produces changes in the primary inductance of the VAGT 200.

The core has an associated total mmf that is a function of the flux and the reluctance, according to:

$$\text{mmf} = \Phi_m (R_m + R_g)$$

Figure 27:
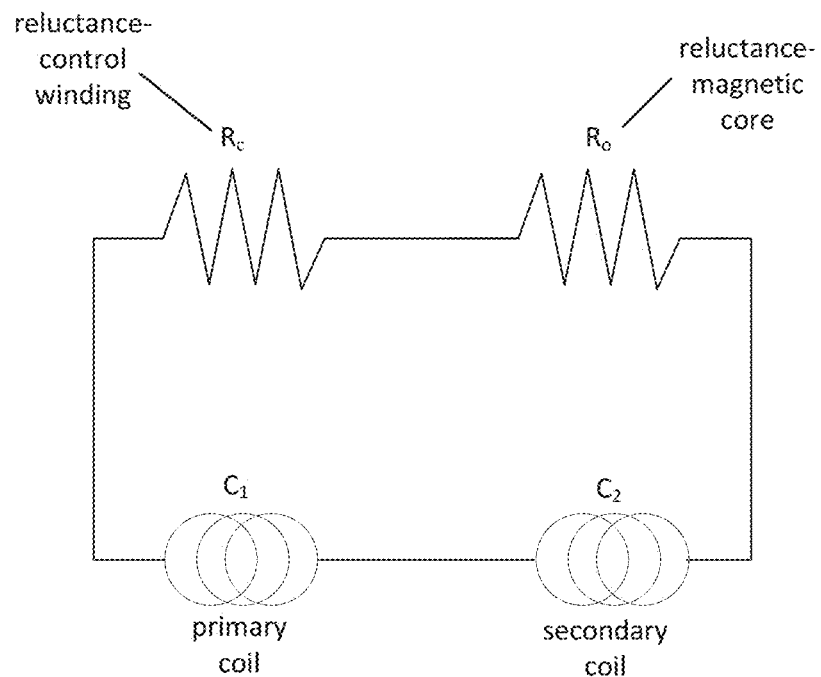
FIG. 27 is a schematic illustration of a magnetic circuit showing the primary and secondary windings, the core reluctance and the controlled reluctance of the virtual air gap.
Figure 29:
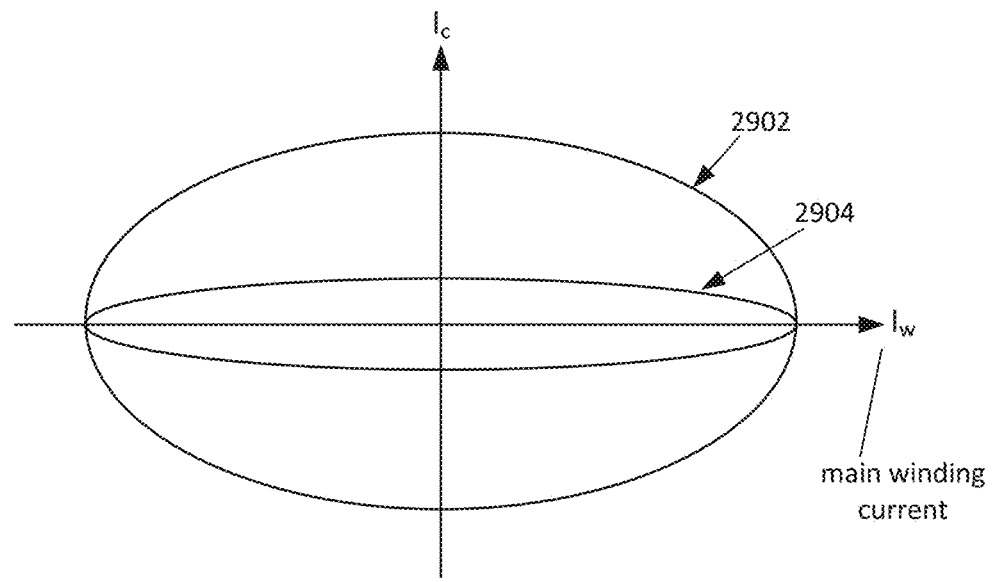
FIG. 29 is a diagrammatic illustration of the relationship between the current in the control winding and the current in the primary winding, and the change in shape by minimising the control current.

If an air gap is inserted into the magnetic circuit, the reluctance increases due to the addition of an air gap reluctance ($R_g$), thereby increasing the mmf. A simple representative circuit diagram of this is provided in FIG. 27. The case for a standard DC driving voltage is different because the mmf and current are constant, with the flux varying with changing reluctance. A DC driving voltage modulated with harmonics is able to reduce harmonic outputs under certain operating conditions (see http://ieeexplore.ieee.org/document/4595983/). An AC driving voltage modulated reduces energy usage, and when correctly controlled improves energy utilisation for the device and the output power. FIG. 29 shows that as the current in the primary winding 204 changes through the cycle, the amount of current required in the control winding 202 changes, thus reducing the control current required (e.g., from curve 2902 to curve 2904) to achieve the output target signal, and improving the efficiency of the device.

The virtual air gap 208 is provided within the primary flux path in order to provide control of the power flow through the VAGT. However, a second virtual air gap 210 may also be provided in the return flux path, as shown in FIG. 2. Depending on the physical structure (including whether the VAGT is single phase or 3 phase), a VAGT may have multiple virtual air gaps, ensuring that, at a minimum, the primary flux path for each phase can be directly controlled. Multiple virtual air gaps can be utilised in some embodiments to vary the level of localised saturation.

As a minimum, a virtual air gap is formed by two DC or AC windings arranged to produce opposing fluxes so that they cancel each other out in relation to the entire VAGT, but saturate the core in each corresponding local saturation region. The specific configuration of a VAGT (including winding and core materials and configurations, laminations, dimensions, core size and shape, number of phases and face configurations, et cetera) can be determined using standard transformer design methods known to those skilled in the art, with the number and location of virtual air gaps, and the configuration of the control winding(s) being determined by the electrical requirements for the specific application.

The magnetic core of the transformer containing the virtual air gap may be made of any material whose magnetic reluctance can be controlled by the current flowing through the control windings, including but not limited to ferromagnetic materials. The core itself may be formed as a unitary structure, or may be constructed from multiple component parts, which may be made from the same or different materials for different regions of the magnetic core. This allows the localised ferromagnetic properties of the core where virtual air gaps are formed to be different to those of other regions of the magnetic core, with different magnetisation curves (also known as magnetic hysteresis curves or more commonly B-H Curves, where B=flux density, H=field strength, p=permeability and B=μH).

The power flow through a VAGT is regulated by controlling its virtual air gap(s) 208, 210. As the input power and output power draw can be constantly changing, the virtual air gap(s) 208, 210 are correspondingly adjusted by changing the DC or AC control current in the control winding(s) 202 to provide a selected level of reluctance. The control current can be either a direct analog signal, where the current level is changed directly, or can take the form of a digital signal using pulse width modulation (PWM) to provide an equivalent average current. PWM uses a digital signal switched at a rate much higher than will affect the load to control the power supplied. Switching the voltage to a load with the appropriate duty cycle approximates the desired voltage level. In the same manner, the duty cycle can be varied to deliver an approximation of an analog waveform using digital sources. Modern semiconductors are able to provide this switching in microseconds, meaning that power loss is very low, but the imperfect waveform produce can cause significant harmonics and losses in some applications.

Figure 24:
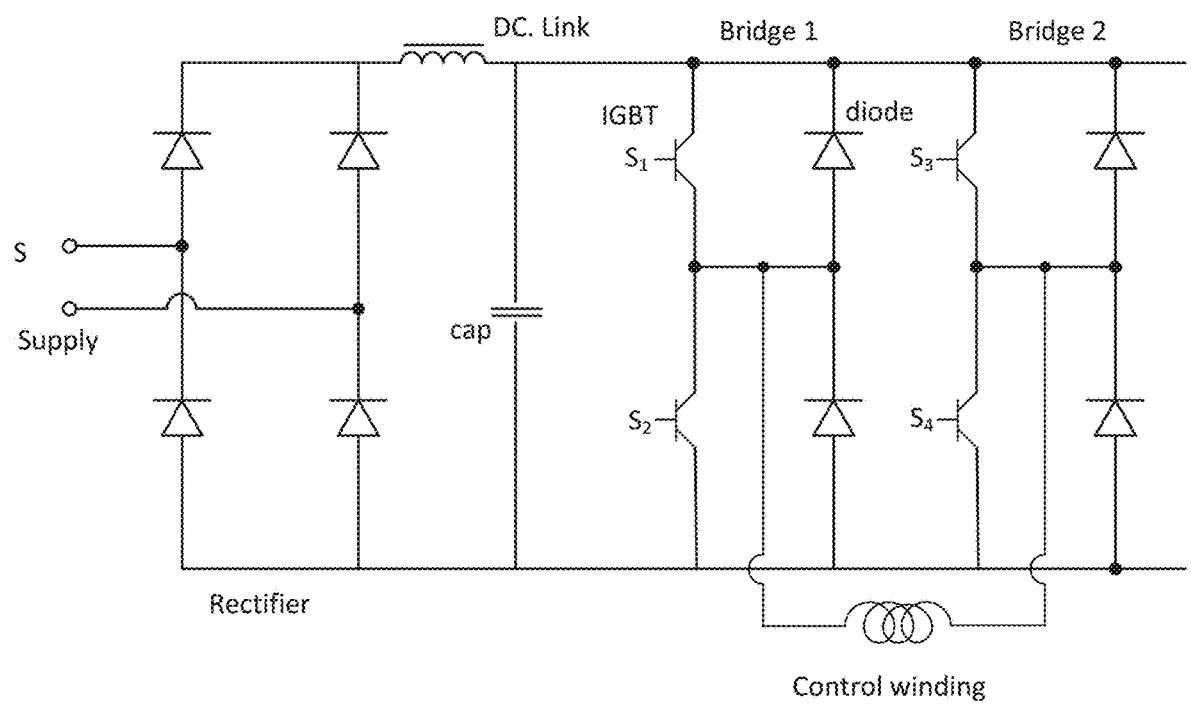
FIG. 24 is a circuit diagram with a rectifier, a DC link and two bridge circuits to provide pulse width modulation of a control winding.

PWM of the current through the control winding 202 is achieved through a control circuit consisting of a rectifier, a DC link, and two bridges, as shown in FIG. 24. The two bridges are made up of four diodes and four insulated-gate bipolar transistors (IGBT). The four IGBT's are switched on and off by controller 106 in order to provide the correct current level in the control winding 202 to deliver the target signal output. It will be apparent to those skilled in the art that this can be achieved in a number of various circuit topologies. A control circuitry topology utilising step down converters (buck converters) allows a greatly reduced power usage to achieve the desired magnitude and range of virtual air gap control.

Figure 30:
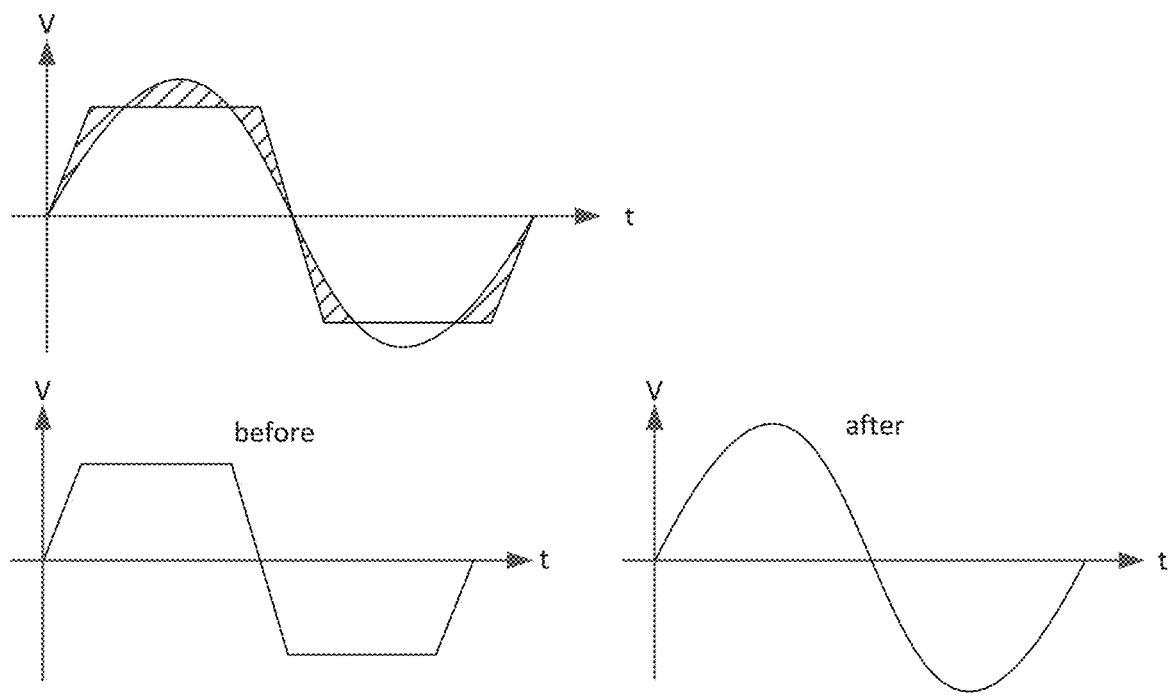
FIG. 30 is a diagrammatic illustration of a waveform before and after modulation through the device, comparing the two on a single axis to demonstrate the short term shift in power from one section of the curve to another.

By controlling the PWM at a speed of 10 kHz, the waveform of the output signal is modulated using the VAG in order to smooth out harmonics, as shown in FIG. 30. It will be apparent to those skilled in the art that the speed of control is bound by the practicality of implementation of technology at the upper end, with any frequency of control being able to be used. Faster control speeds better compensate and correct harmonics.

When the mean power flow is used as the control point, there is approximately equal variance in voltage for both over voltage and under voltage through the VAGT over time. A small amount of internal power storage is available within the VAGT to compensate for the under voltage times, with over voltage peaks chopped. This over voltage power loss is significantly less than the inefficiencies and losses created by passively passing through the over-voltage.

In order to reduce the internal power storage requirement, the power level the VAGT is controlled for can be lower than the mean input voltage. This increases the quantity of over voltage time on average, increasing the corresponding losses which will nevertheless still be insignificant relative to other losses of the distribution network. The exact control power level is determined by the requirements of the specific application.

Figure 36:
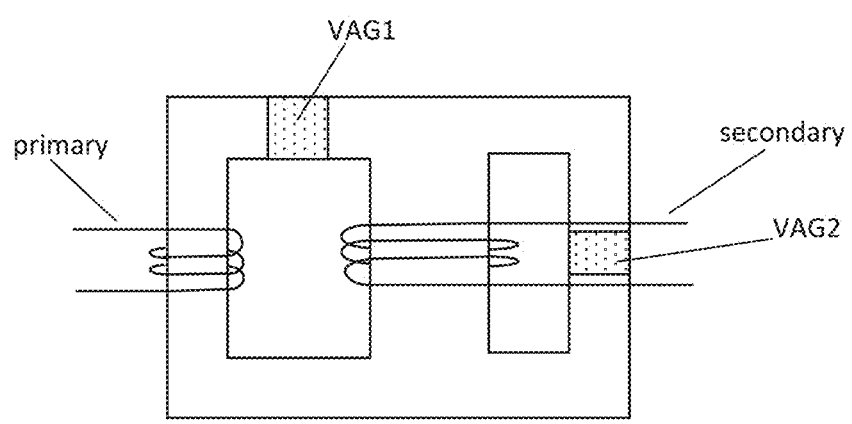
FIG. 36 is a schematic illustration of a composite virtual air-gap transformer (VAGT) with multiple flux paths controlled by multiple virtual air-gaps to allow magnetic flux to controllably distribute between the differing pathways and thus alter the amount of flux flowing through the secondary winding.

As shown in FIG. 36, in some embodiments, the magnetic core has a secondary flux pathway to distribute the flux between two paths through the magnetic core, changing the flux flowing through the secondary winding under steady state conditions. The voltage conversion ratio of the device is directly proportional to the number of primary windings and the primary current, and the number of secondary windings and the secondary current, and is independent of the magnetic circuit reluctance under steady state conditions. The second flux pathway controlled by a second virtual air-gap in combination with the virtual air-gap controlling the primary flux pathway provide the relative distribution of the total flux between the two pathways. The secondary winding on the primary flux pathway will only have a current induced relative to the flux flowing through the primary pathway, and can be changed without changing the number of primary or secondary windings.

In some embodiments, an energy recovery circuit is used to store the excess energy blocked by the virtual air gap and that would be otherwise lost. This energy can be stored within a capacitor, inductor or other energy storage device, and subsequently reinjected into the main power flow through the device directly, or directly from the capacitive, inductive or other storage.

Frequency Conversion

In some implementations of an electrical power control apparatus as described herein, the frequency control component 102 achieves frequency conversion in the same manner as voltage conversion. As the frequency of the coupled electrical system is dependent on the frequency of the generated electricity and balanced with the load, as this balance between generation and load varies, the frequency of the system will vary. By measuring the input and output frequency of the electrical power control apparatus 100, a measured difference indicates an imbalance. Therefore changing the control winding current, and therefore the virtual air gap, the reluctance of the circuit will change and energy will be injected into or taken from the power flow as described below. That is, the same VAGT(s) constitute(s) both the voltage control component 104 and the frequency control component 102, as indicated by the dashed box around the frequency control component 102 and the voltage control 104 in FIG. 1, and there is only a single control signal (representing voltage) from the controller 106 to the VAGT(s), but that signal is also used to control frequency as described above.

The VAG can be used to saturate the core in localised areas and thus affect the flux path. Using the core structure in FIG. 35, the frequency of the output signal can be converted by using multiple VAG's to alternate the flux path through the secondary winding. This allows the same device to function as both an inverter and a rectifier with all switching in the magnetic field, utilising the natural filtering of magnetic circuits.

A large number of possible configurations for the electrical power control apparatus described herein will be apparent to those skilled in the art in light of this disclosure. In one such configuration a core type transformer is manufactured using standard core cutting and stacking techniques (see, for example, http://sites.ieee.org/gms-pes/files/2014/11/Transformer-Manufacturing-Processes.pdf). As shown in FIG. 31, the two core sections with no primary or secondary windings are composed of three sections of ferromagnetic material in series: material 1, material 2, and material 1. Material 1 and 2 have different B-H curves.

6 holes are formed within material 2 of the core during the manufacturing process, at equidistant spaces vertically aligned through the core cross section, as shown in FIGS. 31 to 34. In this particular example, these holes are formed by having the core layers made of separate pieces, as shown in FIG. 33, rather than a single contiguous sheet. These pieces are aligned using spacers during the stacking process which can be removed once stacking is complete.

The primary and secondary windings are wound around the appropriate sections. The control winding is wound between the holes created within the core construction process, as shown in FIG. 32. With the holes numbered 1 through 6 vertically, the winding is formed between holes 1 and 2 for the required number of loops, then 3 and 4, then 5 and 6.

Figure 25:
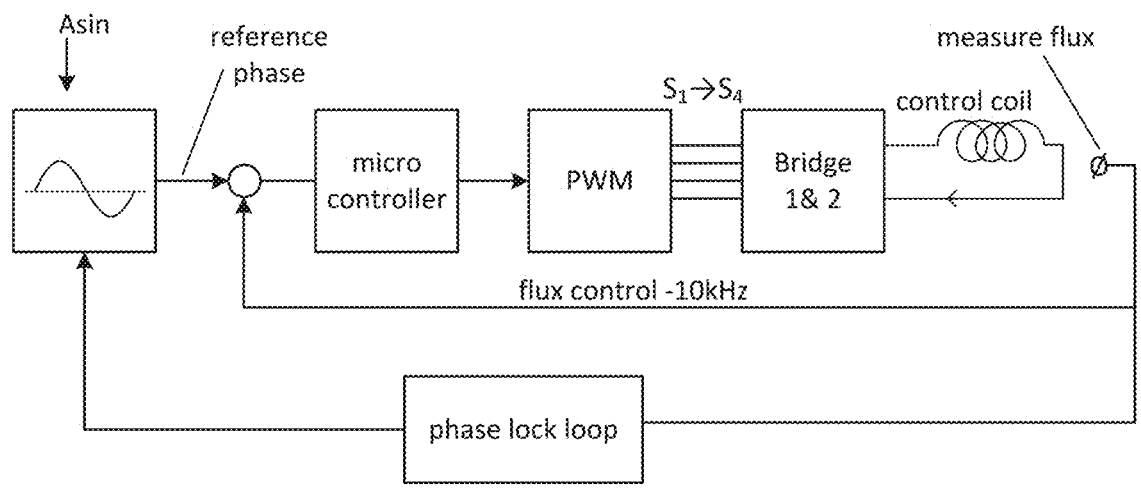
FIG. 25 is a schematic illustration of the control loops and function blocks to provide control of a virtual air gap transformer.
Figure 26:
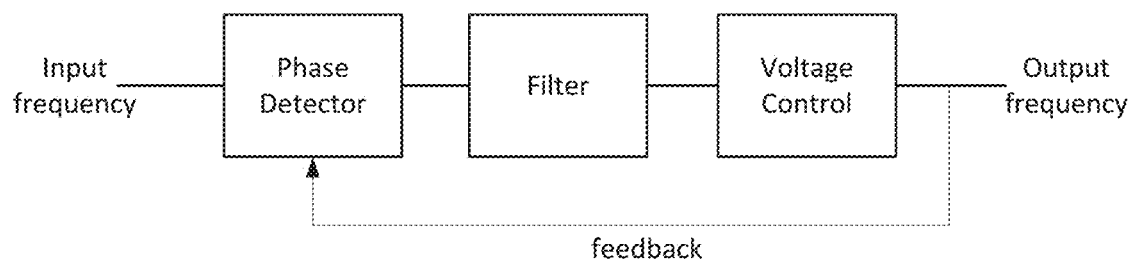
FIG. 26 is a schematic illustration of an implementation of a phase lock loop for use within the virtual air gap control.

The control winding is powered by an electronic circuit switching control circuit, utilising pulse width modulation of an AC control signal, as shown in FIGS. 24 to 26. In some embodiments, a high speed microprocessor (such as the 100 MHz Texas Instruments device described at http://www.ti.com/product/TMS320F2808) is used, and has sensor inputs from the input and output (the circuit directly before the primary and directly after the secondary windings) to measure voltage and frequency, and Hall effect flux sensors (such as http://uk.rs-online.com/web/c/automation-control-gear/sensors-transducers/hall-effect-sensors/) are embedded within the six control winding holes in the core to measure localised flux.

The microprocessor executes a control process to PWM the four IGBT devices in the bridge circuits shown in FIG. 24. This varies the flow through the control coils in order to maintain the correct level of flux at each monitored location, which in combination with the measured voltage and current input and output, delivers the target setpoint at the output. The flux control feedback loop operates at 1 MHz, and the phase lock loop at 100 kHz.

An energy recovery circuit is included to capture and store the energy diverted as a result of the virtual air gap. This recovery circuit includes a capacitor to allow short term storage and smoothing of the energy flow.

Frequency Conversion Using Heterodyning

As an alternative to the above, in some implementations of an electrical power control apparatus as described herein the frequency control component 102 achieves frequency conversion using frequency heterodyne principles from communications theory. Although the use of heterodyning as described herein inevitably incurs energy losses, it can be useful in some applications, particularly where the size and weight of the VAGT are constrained, such as aviation, rail and space, for example. In such applications, the kinetic efficiencies gained can outweigh the additional electrical losses.

As known by those skilled in the art, frequency heterodyning is a method that produces new frequencies by combining or mixing two input frequencies. Two signals at frequencies f1 and f2 are mixed combined to create two new signals called heterodynes, one at the sum f1+f2 of the two frequencies and the other at the difference f1-f2. Typically only one of the new frequencies is desired, and the other signal is filtered out.

Accordingly, in such implementations of an electrical power control apparatus, the frequency control component 102 includes a variable frequency oscillator and a variable frequency filter whose isolation and filter frequencies are determined by the frequency control signals generated by the controller 106, allowing the mixing signal to be varied to ensure that the output signal is always at the desired output frequency. This frequency control also allows the system 100 to be used in the place of a converter (inverter or rectifier).

Returning to FIG. 1, an input signal is shown flowing from left to right in this Figure, with the frequency being adjusted prior to providing a corresponding signal to the VAGT 104. Although this configuration is generally preferred because it allows the VAGT 104 to operate with a signal of known frequency, it is also possible for an input signal to flow in the opposite direction, so that an input signal flows through the VAGT 104 before having its frequency adjusted by the frequency control component 102.

Moreover, the arrangement shown in FIG. 1 can be used to process signals flowing in either direction, which makes it particularly useful for applications such as energy distribution where local energy generation sources (e.g., solar panels on a residential property) can produce energy flowing to the energy distribution network or grid in the opposite direction to energy flowing from the energy distribution network or grid to the residential property.

Figure 4:
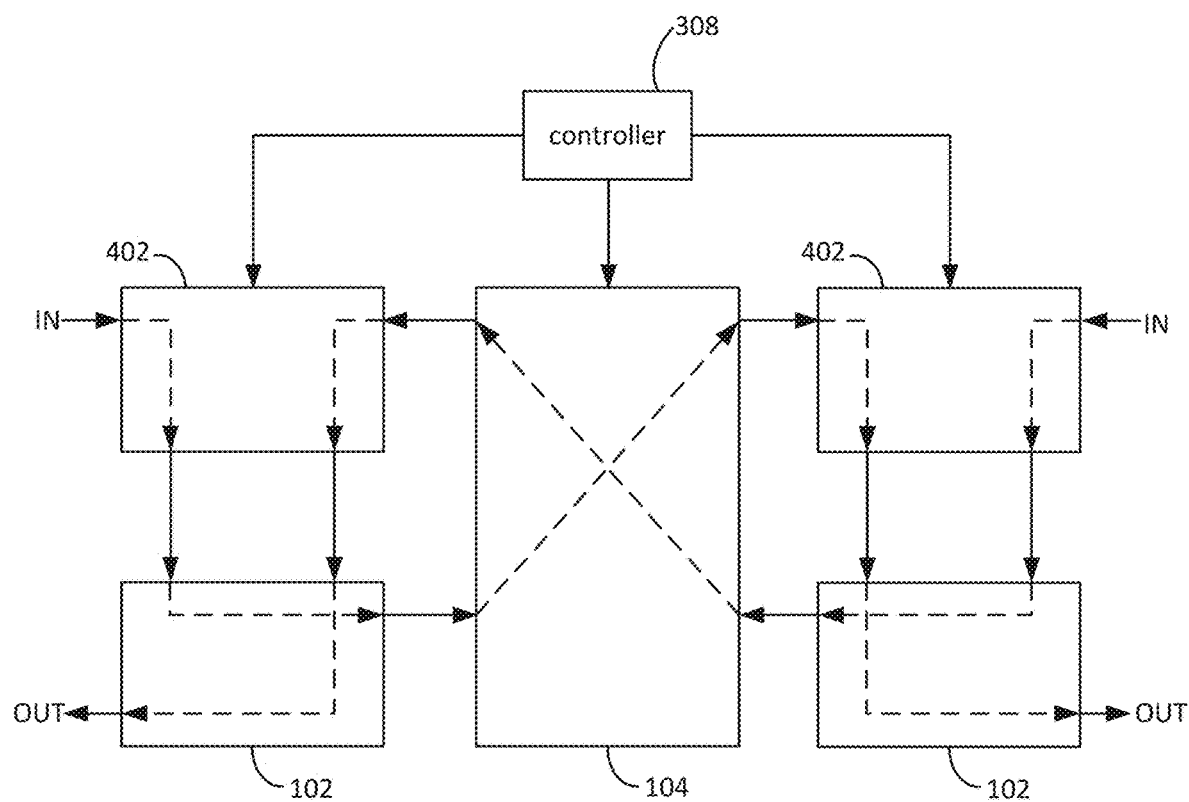
FIG. 4 is a block diagram showing bi-directional flow of electrical energy through an implementation of an electrical energy supply system having two heterodyning components and two filtering components.

For example, FIG. 4 is a block diagram illustrating an electrical energy control apparatus 400 based on that of FIG. 1, whereby the frequency control component 102 includes a heterodyning component 402 and a frequency filtering component 404, with signals flowing in opposite directions through these components 402, 404 in the appropriate order.

Figure 5:
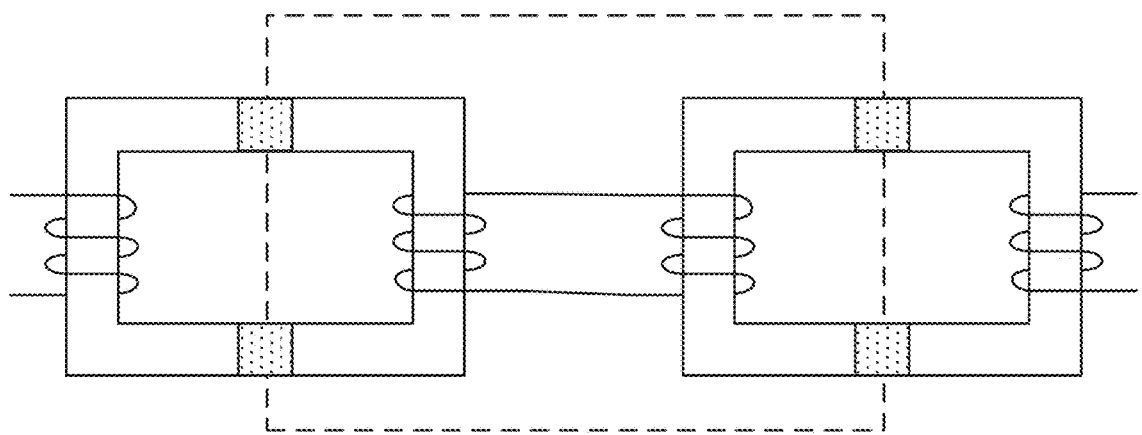
FIG. 5 is a schematic illustration of a composite virtual air-gap transformer (VAGT) formed by two of the single-phase VAGTs of FIG. 1 interconnected in series by way of an internal winding, which can be used to store energy.

FIG. 5 is a block diagram of a further electrical energy control apparatus 500, having two frequency control components arranged at opposite sides of the VAGT 104, which allows input signals travelling in either direction through the system 500 to have their frequencies adjusted before being provided to the VAGT 104, which can be used to improve the efficiency of the VAGT 104. Moreover, this configuration also allows the frequencies of input signals to be stepped up (e.g., to 1 kHz) before being applied to the VAGT 104, and the corresponding VAGT output to be stepped down (e.g., to the appropriate mains supply frequency of 50 Hz or 60 Hz) to provide the desired output frequency. As the electromotive force (EMF) of a transformer at a given flux density increases with frequency, by operating at higher frequencies the transformers can be physically smaller because the core is able to transfer more power without reaching saturation, and fewer turns are needed to achieve the same impedance.

Having a smaller device reduces the copper loss due to the Ohmic resistance of the transformer windings which is a major inefficiency. The loss for the primary winding is $I_1^2 R_1$ and for secondary winding is $I_2^2 R_2$. Where, $I_1$ and $I_2$ are current in primary and secondary winding respectively, $R_1$ and $R_2$ are the resistances of primary and secondary winding respectively. A smaller device also reduces device weight, a significant advantage in applications such as rail, aviation and space, where overall system efficiency is greatly improved by kinetic energy gains.

However the Iron Losses (Eddy Current and Hysteresis losses) are dependent on and increase with frequency. The hysteresis loss (due to reversal of magnetization in the transformer core) is calculated as:

$$W_h = \eta B \text{ max } 1.6 \text{ fV (watts)}$$

Where $\eta$=Steinmetz hysteresis constant, V=volume of the core in m$^3$, and f is the frequency.

As described above, the electrical energy control apparatuses described herein are able to bi-directionally control the voltage, frequency and power factor to completely control power flow and deliver an image of a perfect load to the supply side of the system, whilst matching the power requirements of the load. This directly increases the efficiency of the device itself, but also the transmission and distribution of power to other devices and the other devices themselves.

Figure 35:
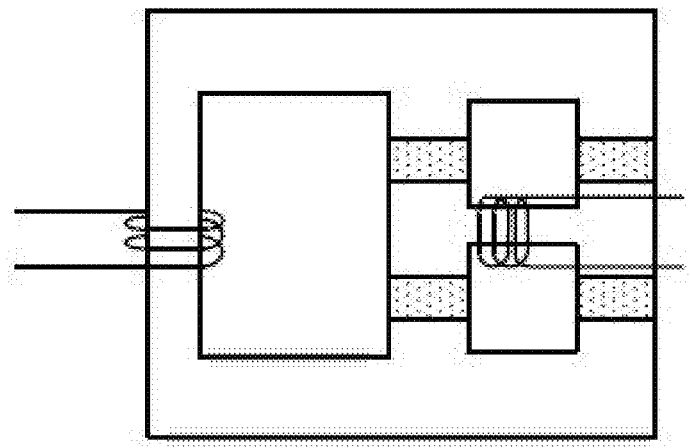
FIG. 35 is a schematic illustration of a composite virtual air-gap transformer (VAGT) with multiple flux paths controlled by multiple virtual air-gaps to redirect flux through the magnetic core and change flux direction through the secondary winding, allowing rectification of AC to DC.

As described below, a modulation and channel-pairing scheme allows power flow through the system to be finely controlled and matched between interconnected power systems and grids to reduce losses and distortion.

Where frequency conversion and control is inefficient by the frequency heterodyning method, the VAG principle can be used to modulate the magnetic flux and convert AC to DC using any of a number of different VAGT configurations. FIG. 35 shows a configuration that utilises a H bridge in order to control the direction of the flux through the secondary coil. As known from Lenz's law, the direction of the induced current is always such as to oppose the change in the circuit or the magnetic field that produces it. Thus changing the flux direction through the winding will shift the current phase 180 degrees (i.e., change the sign positive/negative). By using the VAGs to change this flow in line with the sine waveform, a DC current can be produced.

Figure 38:
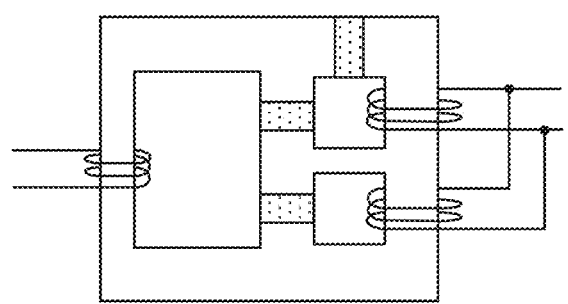
FIG. 38 is a schematic illustration of a single phase virtual air-gap transformer (VAGT), with multiple paths for the flux to travel which can be directionally controlled via the VAGs, with two secondary windings wound in opposite directions, allowing rectification of AC to DC by alternating the flux flowing between each of the secondary windings depending on the phase angle.

An alternate method to do this is shown in FIG. 38, where the VAGs are used to direct the flux through one of two secondary coils wound in opposite directions. It will be apparent to those skilled in the art that a myriad of alternative configurations can be implemented to achieve similar effects. The simple representative schematics provided in FIGS. 35 and 38 can easily be varied and extended to provide multiple flux paths with multiple VAGs, which when combined with appropriate control processes, can deliver frequency control with lower energy loss due to switching events, harmonics and the like.

Energy Storage

The electrical energy control apparatuses described herein store instantaneous power in three ways to enable power flow regulation to be optimised by injecting additional power where required. Power is stored within each virtual air gap as magnetic field energy (see below), using additional energy storage methods such as capacitors, and also internal loops can be provided within each system as described below to hold instantaneous power (if required in the specific implementation). However, the VAGT devices are not able to store power over any period whilst not in operation regulating a power flow, except in the case of embodiments where one or more capacitors are included.

The stored energy (W) of an inductor with an inductance (L) and peak current (I) can be determined by the following calculation:

$$W = \tfrac{1}{2} L I^2$$

This energy is stored as magnetic field energy within the ferrite core. The higher the required stored the energy the larger the required core. The size of an inductor is approximately proportional to the stored energy.

When an air gap is added to an inductor, the reluctance of the inductor is increased. The permeability of the core is three orders of magnitude higher than that of the air gap, meaning that the vast majority of the energy is stored within the air gap, and the amount of energy that can be stored is therefore relative to the size of the air gap according to:

$$W = \frac{1}{2} \frac{B^2 \cdot A \cdot \delta}{\mu_0}$$

where B is the magnetic flux density, A is the cross sectional area, $\delta$ is the width of the air gap, and $\mu_0$ is the permeability of the air gap.

Lenz's law states that the direction of an induced current is always such as to oppose the change in the circuit or the magnetic field that produces it. As such, the stored magnetic energy helps to smooth small power oscillations on the secondary winding(s).

Figure 41:
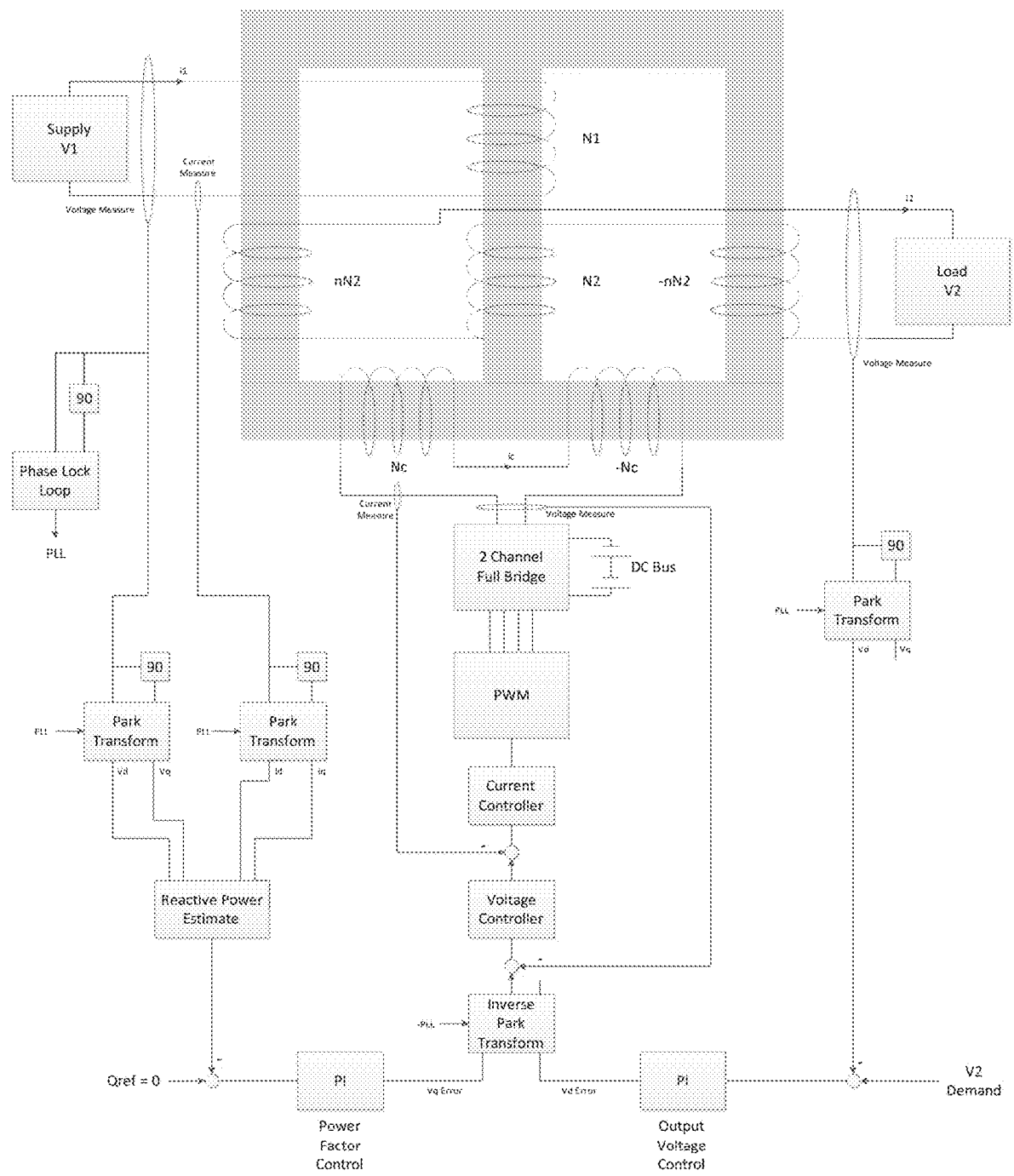
FIG. 41 is a circuit diagram of an embodiment of an electrical power control apparatus in accordance with some embodiments of the present invention.

In some embodiments, a secondary flux pathway is provided such as in the electrical energy control apparatus shown in FIG. 41. This flux pathway loops around the external shell of the core and can be used to store magnetic energy.

In some embodiments, an electrical energy control apparatus includes a composite virtual air-gap transformer (VAGT) consisting of a pair of transformers with virtual air gaps in series, with a wire loop between the secondary winding of one and the primary winding of the other in order to produce a single composite VAGT with an internal current loop. The specifications of the loop are determined by the amount of instantaneous energy storage required. The two transformers with virtual air gaps are controlled as a single device by a single controller. For some applications, this internal loop includes at least one capacitor.

FIGS. 2 and 5 to 13 are schematic diagrams illustrating various different forms of virtual air-transformer (VAGT) that can be used in various embodiments, including composite VAGTs formed by VAGTs interconnected in series by way of an internal loop that can store energy in the form of a magnetic field. For example, the most simple form of VAGT is that shown in FIG. 2, which has a single-phase core with virtual air gaps in the flux path. Energy is stored as magnetic field energy, primarily within the air gaps. Two VAGTs of this type can be interconnected in series in order to form a composite VAGT that is able to store energy by way of an internal winding that interconnects the two VAGTs.

Figure 6:
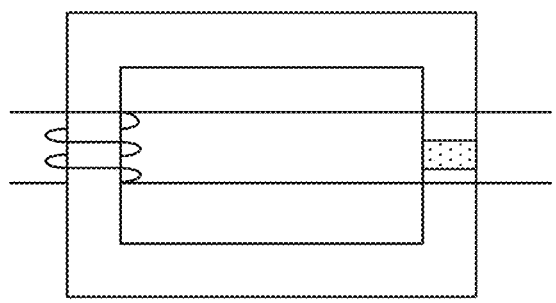
FIG. 6 is a schematic illustration of a second form of virtual air-gap transformer (VAGT) having a single phase core with a virtual air gap in the flux path, and which is able to store energy in the form of a magnetic field energy primarily within the air gap.
Figure 7:
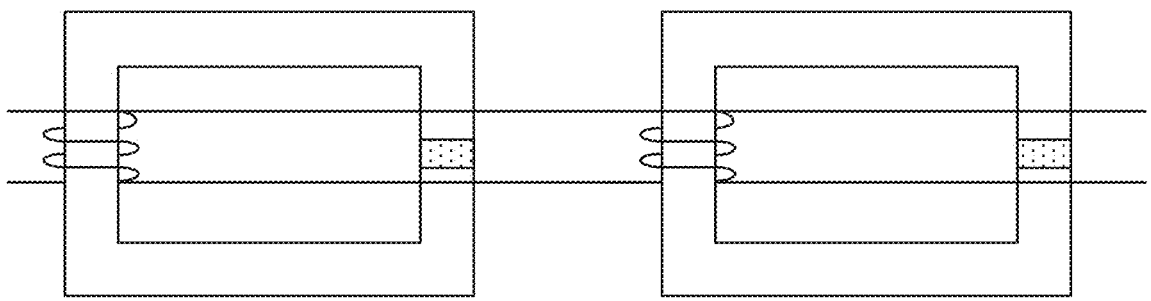
FIG. 7 is a schematic illustration of a composite virtual air-gap transformer (VAGT) formed by two of the single-phase VAGTs of FIG. 6 interconnected in series.

FIG. 6 is a schematic illustration of a second form of virtual air-gap transformer (VAGT) having a single phase core with a virtual air gap in the flux path, and which is able to store energy in the form of a magnetic field energy primarily within the air gap. This form of VAGT has both the primary winding and the secondary winding on the same side of the transformer, with one wrapped around the outside of the other, and an electrical shield between the two. As with the VAGT of FIG. 2, two individual VAGTs of the second form can be similarly interconnected in series to form a composite virtual air-gap transformer (VAGT) as shown in FIG. 7.

Figure 8:
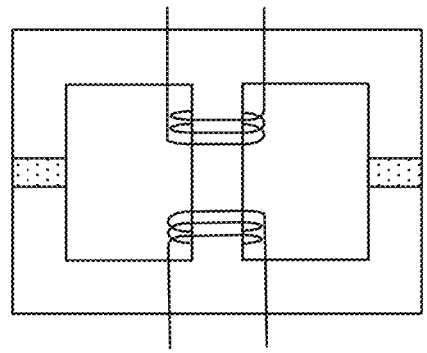
FIG. 8 is a schematic illustration of a third form of virtual air-gap transformer (VAGT) formed by a single phase shell type transformer with virtual air gaps in flux paths.
Figure 9:
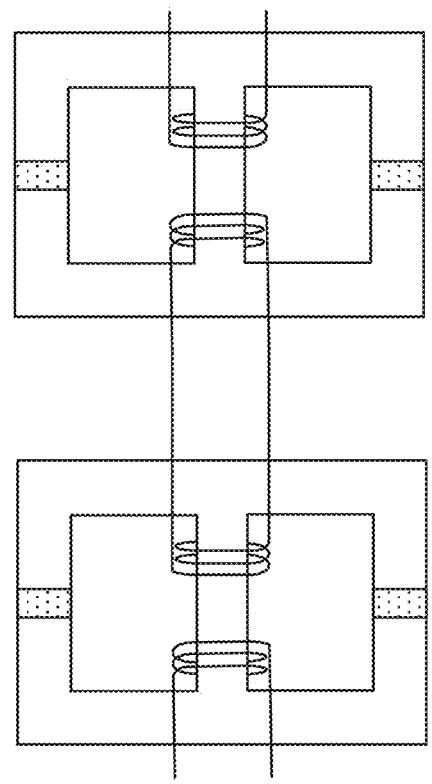
FIG. 9 is a schematic illustration of a composite virtual air-gap transformer (VAGT) formed by two of the single-phase VAGTs of FIG. 8 interconnected in series.

A third form of virtual air-gap transformer (VAGT) is shown in FIG. 8, formed by a single phase shell type transformer with virtual air gaps in its flux paths. Once again, two of these VAGTs can be interconnected in series to form a composite VAGT as shown in FIG. 9.

Figure 10:
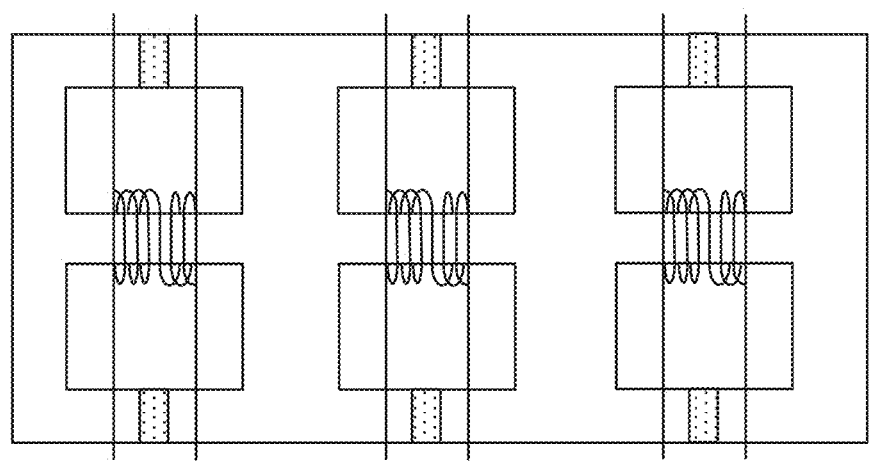
FIG. 10 is a schematic illustration of a fourth form of virtual air-gap transformer (VAGT) formed by a three phase shell type transformer with virtual air gaps in its flux paths.
Figure 11:
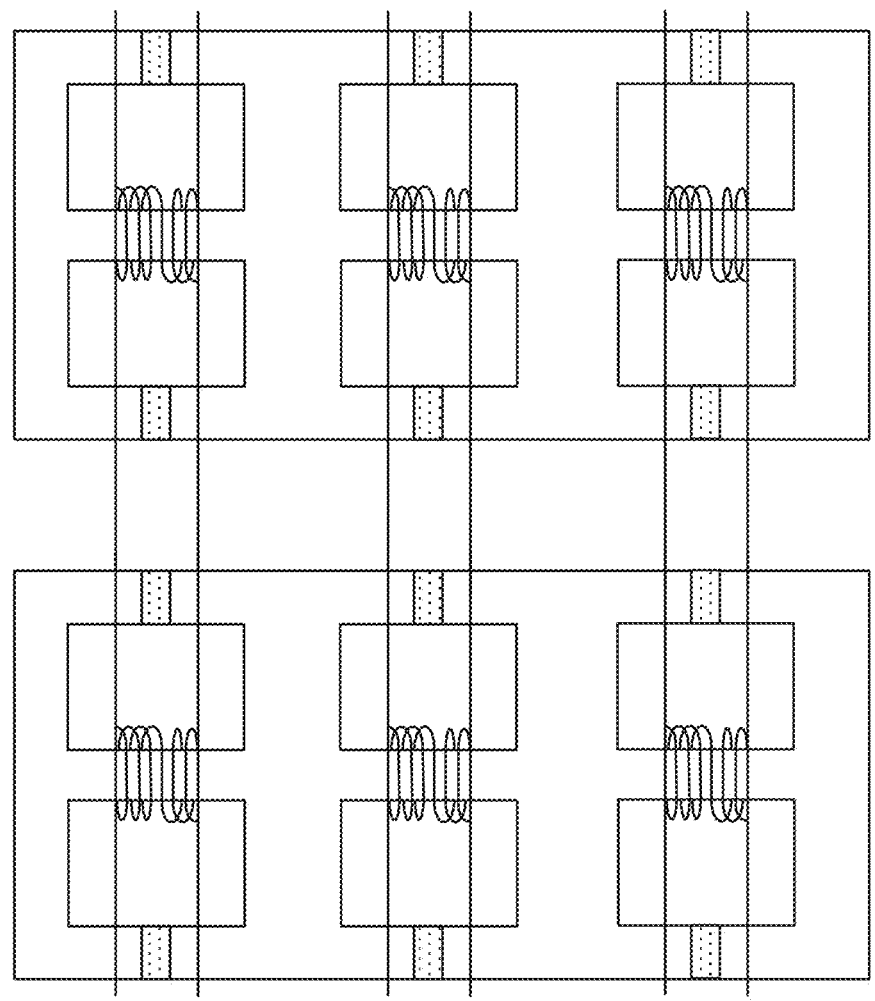
FIG. 11 is a schematic illustration of a composite virtual air-gap transformer (VAGT) formed by two of the three-phase VAGTs of FIG. 10 interconnected in series.

In addition to single-phase VAGTs such as those described above, a VAGT can be formed by a three-phase shell type transformer with virtual air gaps in its flux paths, as shown in FIG. 10 and a pair of these can be interconnected to provide the composite VAGT shown in FIG. 11.

Figure 12:
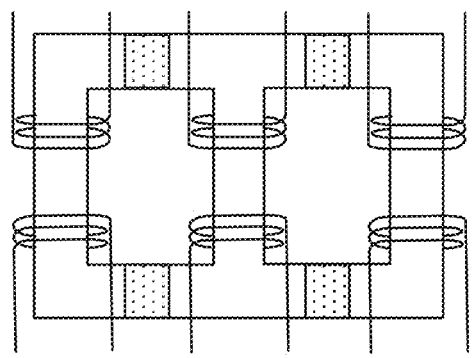
FIG. 12 is a schematic illustration of a fifth form of virtual air-gap transformer (VAGT) formed by a three phase shell type transformer with virtual air gaps in its flux paths.
Figure 13:
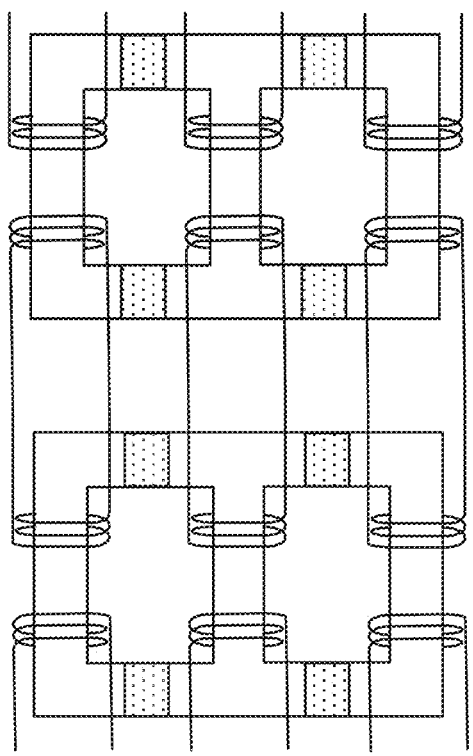
FIG. 13 is a schematic illustration of a composite virtual air-gap transformer (VAGT) formed by two of the three-phase VAGTs of FIG. 12 interconnected in series.

FIG. 12 is a schematic illustration of a fifth form of virtual air-gap transformer (VAGT) formed by a three phase shell type transformer with virtual air gaps in its flux paths, and once again a pair of VAGTs of this general form can be interconnected in series to provide a composite VAGT, such as that shown in FIG. 13.

FIGS. 15 through 22 are schematic diagrams illustrating various different forms of virtual air gap configurations, as demonstrated on a single phase core type transformer core. It will be apparent to those skilled in the art that these and other configurations can be extended to have multiple VAGs, to three phase devices, and to shell type cores.

Figure 15:
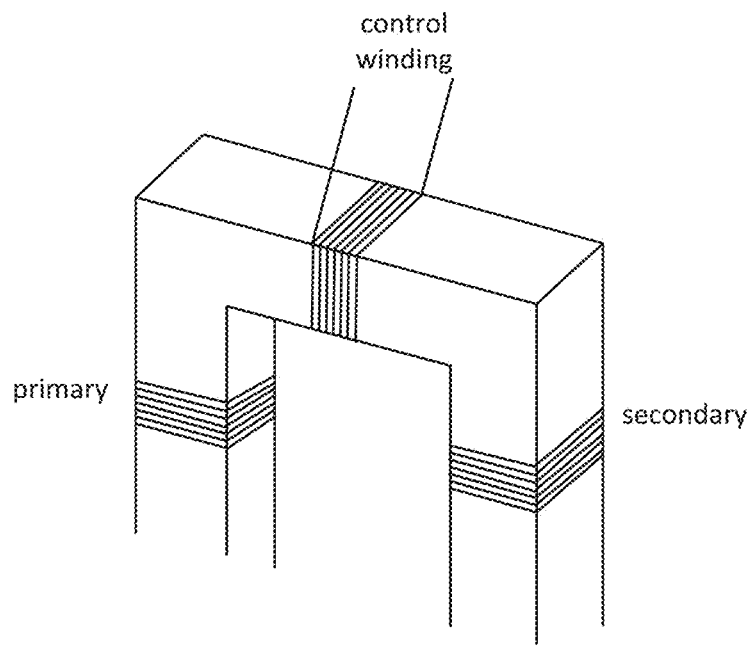
FIG. 15 is a schematic illustration of one implementation of a virtual air gap transformer using a control winding around the core of the device.
Figure 16:
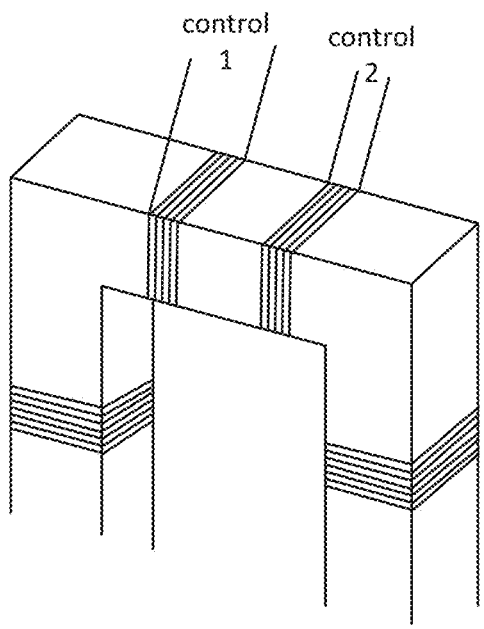
FIG. 16 is a schematic illustration of an alternative implementation of a virtual air gap transformer having multiple control windings around the core of the device to form respective multiple virtual air gaps within the device.
Figure 17:
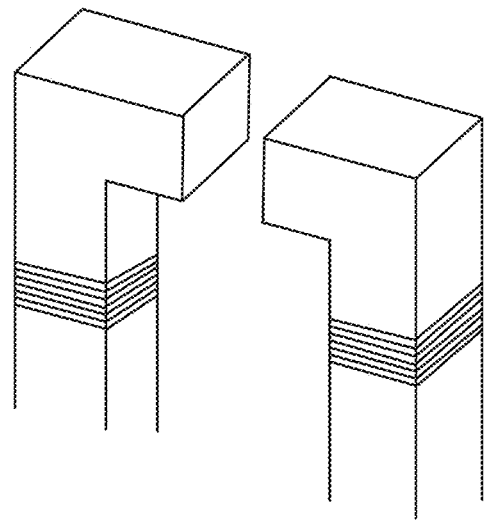
FIG. 17 is a schematic illustration showing two components of a transformer core prior to joining the two components together with a control winding therebetween to form an implementation of a virtual air gap transformer shown in FIG. 18.
Figure 18:
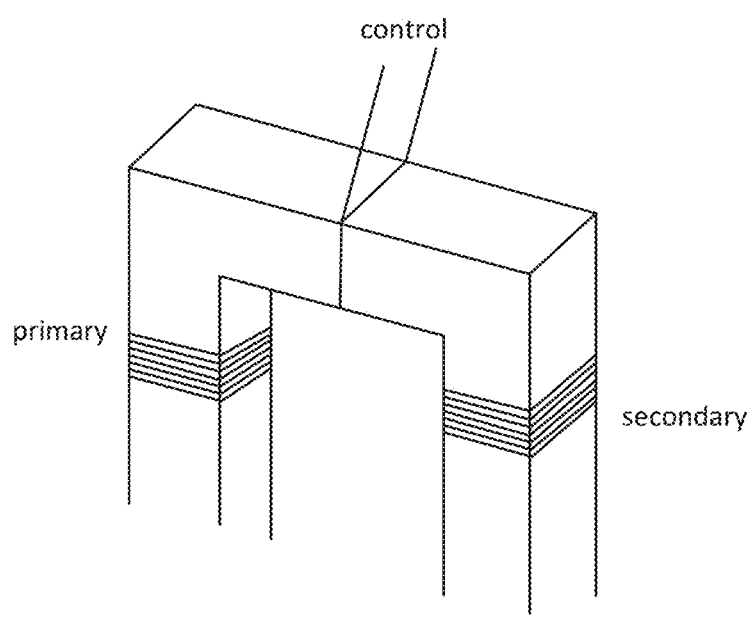
FIG. 18 is a schematic illustration of a virtual air gap transformer formed from the components shown in FIG. 17 and a control winding therebetween.
Figure 19:
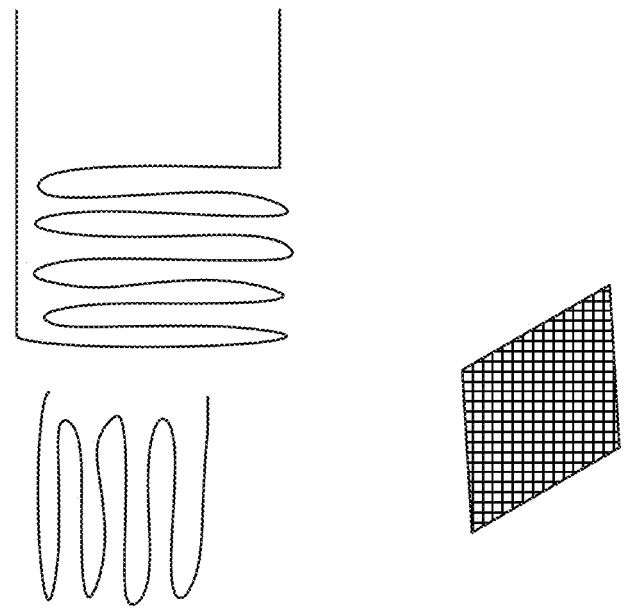
FIG. 19 shows three of the many possible configurations of the control winding used between the pole components of FIGS. 17 and 18.

FIG. 15 is a schematic illustration of an implementation of a virtual air gap transformer (VAGT) using a control winding around the core of the device. FIG. 16 is a schematic illustration of an implementation of a virtual air gap transformer using control windings around the core of the device to generate multiple virtual air gaps within the device, extendible to any practical number of virtual air gaps that can be physically formed or manufactured. FIG. 18 is a schematic illustration of an implementation of the virtual air gap using a control winding between two components of the magnetic core, shown separated in FIG. 17. The winding may consist of wire in any combination of orientations and loops as required, either by itself, or stabilised with a material that the winding is wound around, across, or within. FIG. 19 shows various configurations of the control winding used between the two components of the magnetic core in various different embodiments of the VAGT of FIG. 18. As will be apparent to those skilled in the art, this control winding can be formed by any number of windings in any angle and configuration, either as a solitary item, or wound around a framework or former.

Figure 20:
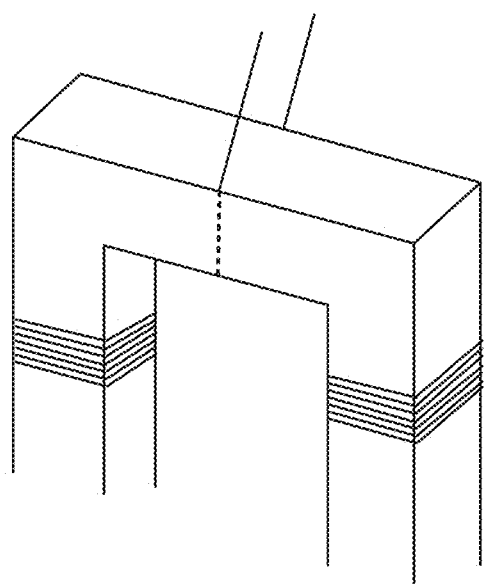
FIG. 20 is a schematic illustration of an implementation of a virtual air gap transformer using a control winding embedded within the magnetic core of the transformer by threading the wire through holes formed through the core.
Figure 21:
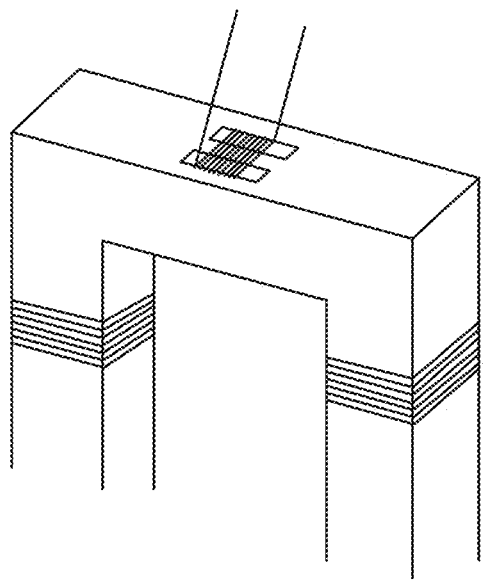
FIG. 21 is a schematic illustration of an implementation of the virtual air gap using a control winding embedded within the core, being wound between columnar openings in any direction (x, y, or z axis)
Figure 22:
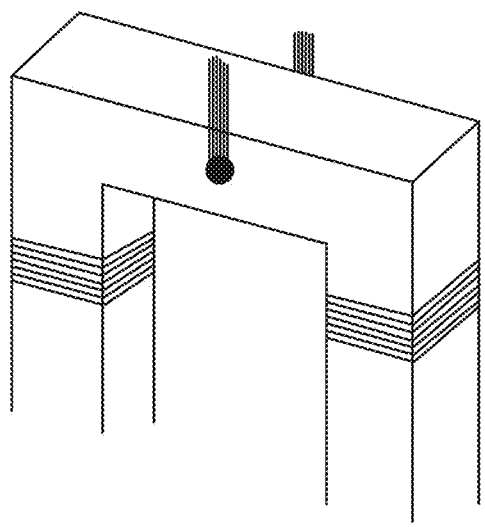
FIG. 22 is a schematic illustration of an implementation of the virtual air gap using a control winding embedded within the core by feeding it through a circular opening formed through the core.
Figure 23:
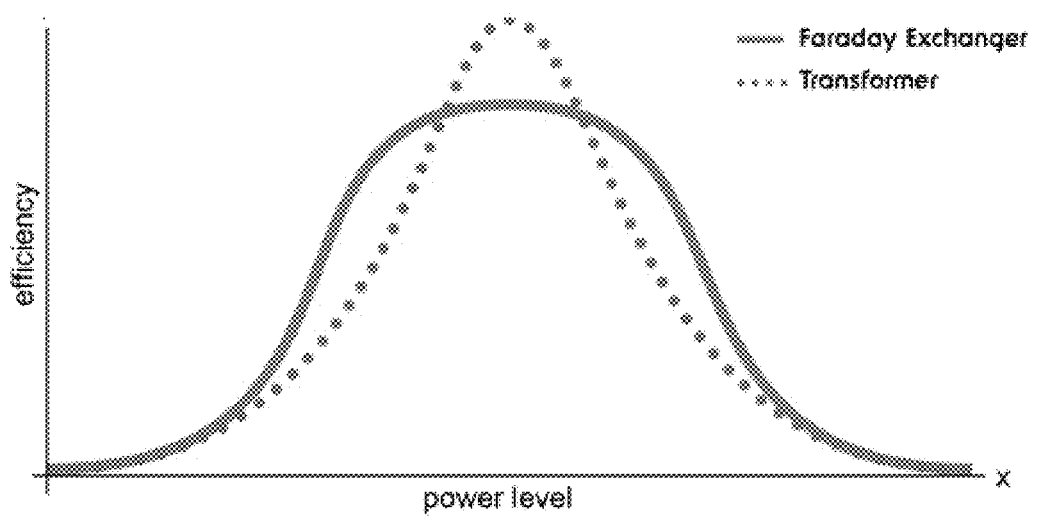
FIG. 23 is a graph of the conversion efficiency of electrical energy supply system described herein compared to that of a traditional transformer (the electrical energy supply system has a lower peak efficiency because it uses power to control the device, however the device has a much wider efficiency band providing better flexibility)

FIG. 20 is a schematic illustration of an implementation of a virtual air gap transformer using a control winding embedded within the magnetic core. This can be in any directional (x, y, or z axis). FIG. 21 is a schematic illustration of an implementation of the virtual air gap using a control winding embedded within the core, being wound in any direction (x, y, or z axis) through columnar openings formed within the core. FIG. 22 is a schematic illustration of an implementation of a virtual air gap transformer using a control winding embedded within the core by feeding it through a circular opening formed through the core.

Controller

As described above, the controller 106 receives a signal representative of the frequency and voltage of a corresponding input signal applied to the system, and, in implementations where heterodyning is used, generates corresponding frequency and voltage control signals that are respectively provided to the frequency control components 102 and the voltage control component 104 in order to control the operation of each of these components to ensure that the corresponding output signal has the desired target output frequency and output voltage.

In the described embodiments, Hall effect flux sensors are utilised located at the specific points where the control winding(s) interact and affect the flux in the magnetic core. These measurements are used in conjunction with the input and output voltage and frequency to determine the control signal required. However, it will be apparent to those skilled in the art that other measurement sensors and techniques can be used to monitor the flux, such as a winding around the magnetic core that will have a current induced based on the flux.

The operational speed of the controller 106 is dependent on the frequency of the power flow being controlled by the system. Given this can be in the kHz range (rather than 50 Hz or 60 Hz for applications in electrical power distribution) after frequency heterodyning, high speed control can be utilised if required by the application requirements in use within a system. Within an electricity grid of 50 Hz or 60 Hz, microprocessors with relative low clock frequencies in the MHz range are sufficient.

The controller 106 constantly measures the voltage and frequency of the input signal and, in some embodiments (most commonly, in embodiments having two VAGTs connected in series), also the voltage and frequency of the output signal to directly control the variable air gap(s) and (where applicable) frequency heterodyning by way of the voltage and frequency control signals in order to maintain a power factor as close to 1 as possible.

In situations where the input in providing more power than the output requires at that instant, the controller reduces the power flow through the VAGT by increasing the reluctance of the VAGT and therefore reducing the flux. Increasing the reluctance of the VAGT means that additional power is stored in the magnetic field of the VAGT.

In situations where the input is providing less power than the output requires at that instant, the controller determines this by monitoring the input and output signals, and generates corresponding control signals to increase the power flow through the VAGT by decreasing the control current in its control winding(s). This decreases the reluctance and increases the flux in the VAGT, discharging stored magnetic energy within the VAGT to the output, thereby delivering an essentially instantaneous power output that is greater than the power input to the VAGT. If the VAGT is already at a minimum level of reluctance (i.e., the DC control current is already zero and thus cannot be decreased further), in some embodiments the energy stored within an internal loop (and capacitor(s) or other energy storage, where available) can be used to compensate for this lack of power in the short term.

An alternative control methodology for the electrical power control apparatus is a lagging control (rather than a leading control as described above). In this configuration, the system acts in a synchronous manner, with the input and output injecting and sucking energy out of the magnetic field as required and based on the instantaneous input and output power levels. This then changes the reluctance of the magnetic circuit and the balance of efficiency of energy transfer between the primary and secondary windings. The controller monitors the input and output, and then reacts to the effect of this imbalance to bring the system back to balance.

The ratio of the VAGT windings, the control windings, and the internal loop and capacitor size can all be selected to provide the best balance of efficiency and capacity to compensate for under power situations.

In the described embodiments, the controller 106 is implemented as a field programmable gate array (FPGA), powered from the power flow through the device, and the electrical power supply processes are implemented as configuration data stored in non-volatile memory. However, it will be apparent to those skilled in the art that in other embodiments the controller 106 could be implemented as an application-specific integrated circuit (ASIC), or as a microprocessor programmed to execute instructions stored in non-volatile memory. It will also be apparent to those skilled in the art that in other embodiments the controller may be powered by a separate local power supply where available, such as local control power from a distribution board.

Extending upon the PWM control implementation described above, the measured flux is used for a control feedback loop with the FPGA (or other controller device, where applicable) as shown in FIG. 25. The reference signal for this control is provided by a phase lock loop (PLL) driven by the measured flux. The phase lock loop uses a phase detector, filter and voltage control oscillator with a feedback loop to lock the input and output frequency with each other as shown in FIG. 26. In the described embodiments, the phase lock loop is controlled at a speed of 1 kHz; however, it will be apparent to those skilled in the art that a different control speed can be used in other embodiments.

Figure 14:
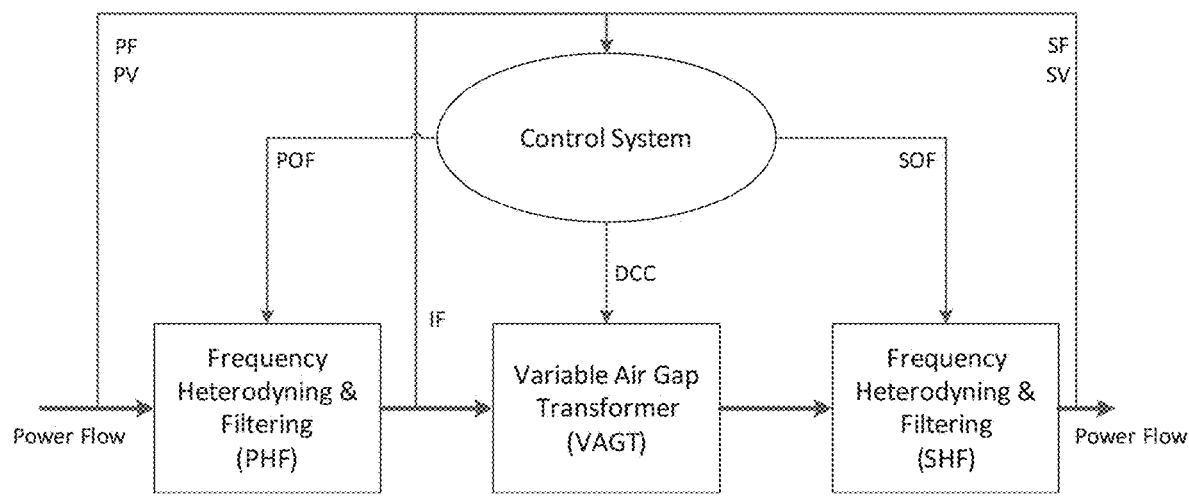
FIG. 14 is a simplified block diagram illustrating the flow of signals between components of an energy supply system implemented to support heterodyning.

With reference to the schematic diagram of FIG. 14, Table 2 below shows the inputs, outputs and internal variables used by the controller 106 to control the operation of an electrical energy control apparatus having two frequency control components 102 functionally disposed on either side of a voltage control component or VAGT 104, as described above.

| Name | Description | Type |
| --- | --- | --- |
| PF | Primary Frequency | Analogue Input |
| PV | Primary Voltage | Analogue Input |
| SF | Secondary Frequency | Analogue Input |
| SV | Secondary Voltage | Analogue Input |
| IF | Internal Frequency | Analogue Input |
| POF | Primary Oscillator Frequency | Analogue Output |
| SOF | Secondary Oscillator Frequency | Analogue Output |
| DCC | DC Control Current | Analogue Output |
| PFS | Primary Frequency Setpoint | Control Variable |
| SFS | Secondary Frequency Setpoint | Control Variable |
| PVS | Primary Voltage Setpoint | Control Variable |
| SVS | Secondary Voltage Setpoint | Control Variable |

Control Diagram

Each of the PDF, VAGT and SHF receives a control input from the controller 106 in the form of an analogue signal. The controller 106 system receives analogue inputs from the power flow through the device using standard phase and voltage measurement devices on the input and output signals in order to determine what its control outputs are. Suitable devices include those described at http://www.ni.com/whitepaper/8198/en/#toc3, https://www.pce-instruments.com/english/measuring-instruments/test-meters/3-phase-power-meter-kat_155415_1.htm, http://w3.siemens.com/powerdistribution/global/en/lv/portfolio/pages/7km-pac-measuring-devices.aspx, and http://www.schneider-electric.com/en/product-category/4100-power---energy-monitoring-system.

To illustrate the general operation of the electrical power control apparatuses described herein, the following describes the steps of an electrical power supply process for an example case wherein an electrical power control apparatuses receives single phase power in the form of an input signal with power flow from primary to secondary, i.e. to a source on the primary side and a load on the secondary side.

1. Input to device is PF and PV
2. Measure PF and PV as input into PHF
3. Calculate the required POF to create the required frequency input for the VAGT
4. Inject POF into PHF and filter out undesired heterodyne
5. PHF outputs power with voltage PV and frequency IF at much higher level than PF
6. Measure IF as input into VAGT along with PV
7. Calculate the required DCC based on PV and SV to inject into VAGT to deliver SVS
8. Inject DCC into VAGT to control the mmf (magnetomotive force) by varying the reluctance of the VAGT, thereby affecting the output voltage with a fixed winding ratio
9. VAGT outputs power with voltage SVS and frequency IF
10. Calculate the required SOF to create the SFS
11. Inject SOF into SHF and filter out undesired heterodyne
12. SHF outputs power with voltage SVS and frequency SFS
13. Output of device is SVS and SFS to align with SV and SF The same process applies for reverse power flow by interchanging the primary and secondary inputs, outputs and setpoints. The same process can be used for 3 phase power by applying to each phase.

It will be apparent that the electrical power control apparatuses described herein are particularly advantageous as they are able to dynamically and rapidly respond to changes in the input energy received by the system in order to generate corresponding output energy having a target voltage and a target frequency. In particular, this ability allows them to match the output energy to the energy required by the loads on the system. Moreover, the electrical power control apparatuses are bi-directional, meaning that they are able to do this for energy supplied from an energy grid and flowing in one direction, for example, and also for energy supplied from renewable energy sources, which may be flowing through the system in the opposite direction. For example, changes in local energy generation arising from changes in wind and/or changes in available sunlight are able to be mitigated by the system and process to provide a relatively constant output for a fixed load. Similarly, changes in the load can be compensated for within the ability of the corresponding virtual air-gap transformer(s), which of course are constrained to operate within the voltage range determined by the limits of zero and complete local saturation within the magnetic core of each individual VAGT, which are determined by the configuration of each VAGT. It will be apparent that a range of VAGTs with different virtual air-gap configurations can be manufactured to meet respective requirements of voltage and power variability for given applications.

Although the electrical power control apparatuses described herein can be used to provide electrical power in a variety of different application contexts, they are particularly useful when distributed throughout an electrical power distribution network to form what is effectively a new type of electrical power supply network or grid, as described below.

Electrical Power Distribution Networks and Processes

The electrical power control apparatuses described above can be interconnected to form an electrical power distribution network wherein an output of each of the electrical power control apparatuses is connected to an input of at least one corresponding other of the electrical power control apparatuses and to one or more corresponding sinks (i.e., loads) and/or corresponding sources (e.g., power generation systems such as solar panels, wind farms, oil or gas turbines, etc) of electrical power. When interconnected in this manner, the electrical power control apparatuses operate autonomously but collectively maintain the voltages and frequencies of electrical power signals flowing through the electrical power distribution network at target values to compensate for variations in the sinks and/or sources of electrical power.

The electrical power distribution network provides a responsive and efficient framework for electrical energy to be delivered from one location to another under a wide range of generation and consumption performance conditions. This framework operates under autonomous decentralised control, whereby the electricity network is self-managing and provides a level of electrical inertia and short term load balancing.

This is achieved by arranging multiple electrical power control apparatuses throughout the network to receive input electrical energy in the form of an input signal having essentially arbitrary and unknown or at least variable frequency and voltage, and to convert that input electrical energy to output electrical energy in the form of an output signal having a desired or 'target' frequency and a desired or 'target' output voltage. The input electrical energy will typically vary over time (that is, its frequency and/or characteristic voltage is time-dependent), and thus each electrical power control apparatus operates to dynamically control the conversion so that its output electrical energy has the desired target frequency and target voltage, which themselves may also vary over time.

When these electrical power control apparatuses are distributed throughout a power transmission and distribution network (from the very simple to the very complex) in strategic locations where any modification to voltage or frequency is required, the output of each apparatus provides the input to the next apparatus in the power supply chain, providing a more stable and lower noise input power signal. This prevents network disturbances which could be caused by generation, consumption, or other reasons from aggregating and propagating throughout the electrical power distribution network. This in turn minimises the losses resulting from the network operating outside peak performance characteristics.

The electrical power control apparatuses are also located at points of supply and consumption of the electrical energy to and from the network. At locations where power is injected into the network, the electrical power control apparatuses ensure that the maximum amount of useful power is injected into the network without negatively effecting efficiency. At locations where power is consumed from the network, the electrical power control apparatuses operate to ensure the maximum amount of useful power is consumed in order to minimise reactive power and other negative impacts on network efficiency.

Embodiments of the present invention are able to provide frequency and voltage conversion while simultaneously providing power factor correction, utilising high-speed electromagnetic path switching instead of electronic circuit switching to deliver improved efficiency and regulation (as well as electrically isolating the two systems).

Each of the electrical power control apparatuses can include one or more energy storage components storing electrical energy, and use its energy storage components to store electrical energy when it receives more electrical power than is required at its output, and to release stored electrical energy from its energy storage components when it receives less electrical power than is required at its output.

The use of energy storage components allows the network to be more efficient by improving the compensation of small and rapid fluctuations in energy requirements at different locations throughout the network, maintaining the voltages and frequencies at those locations to be as close as possible to the desired target values. The reduction of these variations constitutes a reduction of noise throughout the network, reducing losses and improving efficiency.

In this specification, unless the context indicates otherwise, the term "signal" is used for convenience of reference, and is to be construed broadly as referring to a form of electrical energy characterised by a voltage and at least one fundamental frequency (which could be zero in the case of a DC voltage), and does not necessarily require that any form of information is represented by or conveyed by the signal, notwithstanding that some embodiments of the invention may involve the communication of information encoded in the signal.

Figure 37:
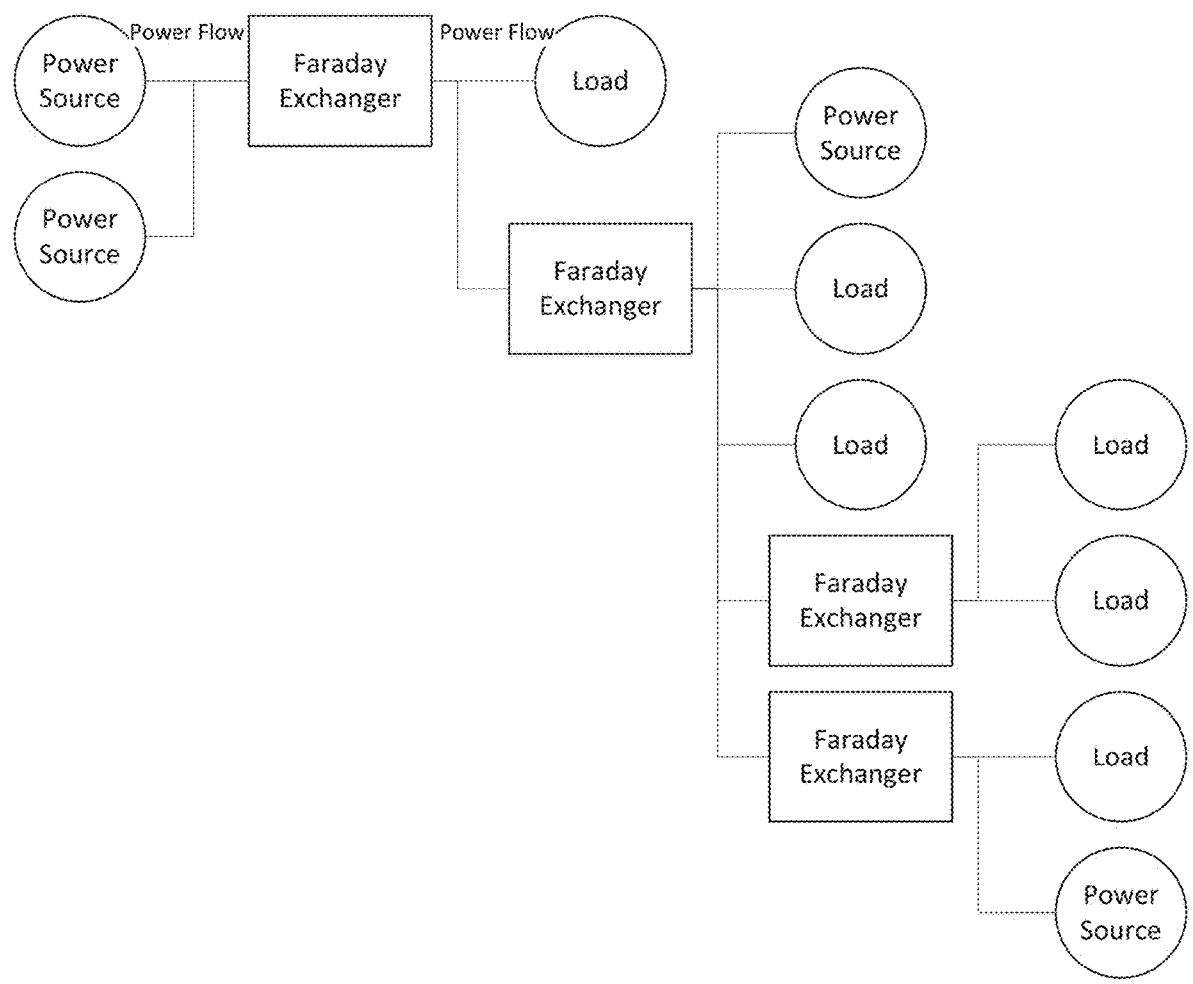
FIG. 37 is a simplified block diagram illustrating how the devices may be arranged within a power supply network to modulate and balance the power flow throughout the network.

As shown in FIG. 37, an electrical power supply network or grid includes the following network components:
  (i) power sources (anything that injects electrical power into the system);
  (ii) loads (anything that consumes electrical power from the system); and
  (iii) electrical power control apparatuses as described herein, distributed throughout the network to receive input electrical power from corresponding power sources (either directly, or via one or more other network components) in the form of input signals having respective input voltages and respective input frequencies, and to generate corresponding output power of a desired or target output voltage and frequency.

The network described herein thus operates to maintain an optimum (or at least improved) power flow from the power sources to the loads. For example, each electrical power control apparatus dynamically balances the power flow from a corresponding source to at least one corresponding load so that the power source always appears to see a perfect load, and the load always appears to see a perfect source, meaning that the power factor of the system is 1: i.e., the energy supplied equals the energy used. As described above, the electrical power control apparatuses described herein autonomously adapt to maintain this efficiency under varying conditions.

An electrical power network can include any practical number of each of the network components to form complex systems as shown in FIG. 37. Although power always flows from a source to a load, because the electrical power control apparatuses described herein are bi-directional, they do not have to be arranged in an entirely linear manner.

The properties of the electrical power control apparatuses described herein mean that the sources and loads within the network do not need to operate at the same voltage or frequency (as an example, an electricity network can be configured to change the voltage throughout the network to minimise resistive losses whilst delivering power at manageable levels to end users).

Control

The electrical power supply network utilises a decentralised control methodology which can be considered as consisting of a number of individually operating nodes within the network. In this context, a node within the network is any point at which the electrical waveform is modified to achieve a target voltage and/or frequency. Each of these nodes in the network consists of a corresponding electrical power control apparatus as described herein, which is capable of dynamically modulating the voltage, frequency and power factor of its output.

Each electrical power control apparatus operates in an autonomous manner to manage its immediate network area to maintain a stable and efficient power flow. It does this by continuously monitoring its input and output waveform, and dynamically controls the power flow to maintain optimality. This control is independent of the equipment connected to the input and output of the electrical power control apparatus, meaning that no knowledge of other equipment or additional information input is required.

Each electrical power control apparatus has a physical design and on-board control system programmed specific to the setpoints for input and output in its area of the system. When multiple electrical power control apparatus nodes are combined in a system, an emergent order is inherently formed as the output of one electrical power control apparatus is the input to another electrical power control apparatus. This maintains a stable balance of supply and demand throughout the network, allowing it to adapt to power volatility at a millisecond level. The network is able to continuously operate at its optimal point without the need for additional control systems.

Governance

Governance is the framework of procedures and rules over a system to enable the agent's intentions (those of the parties that consume, generate and distribute) within the system's operable constraints.

An order of any type requires governance, and an emergent order of decentralised 'choice machines' (in the current context, being the electrical power control apparatuses) requires a distinctly different ontology and archetype of governance to a centrally controlled one (such prior art electrical power distribution networks/grids).

With an intention to reliably sustain supply of energy to consumers at the lowest possible cost and independent of the nature and distribution of generation, the electrical power distribution network described herein regulates voltage, frequency, power factor and network harmonics in dynamic equilibrium. The electrical power distribution network enables the parties to the system to achieve their intentions in a novel manner. The behaviour of the same parties to the existing grid are governed centrally by dictate within a much narrow range of operational parameters with the necessity to maintain system balance. The rules governing the active management of key aspects of power transfer have the intended consequence of increasing the operable parameters available to system agents, as a consequence the rules governing system generators and consumers are materially less constraining.

Governance of the electrical power supply network is separate from control of any single or combination of the electrical power control apparatuses. The operation and control of each electrical power control apparatus within the electrical power distribution network is autonomous, allowing the electrical power supply network to form and operate within an emergent order. This emergent order by definition is adaptable, and will tend toward system stability and optimality.

System governance is delivered through the shared objective of all agents and apparatuses in the network, namely to operate within the rule set of the electrical power supply network.

Communication

Primary Communications

The network can utilise the inherent information that is the electrical waveform itself to communicate and interoperate control and modulation requirements across the electrical power control apparatuses in the system.

Electrical power is a complex signal with many variables including phase, voltage, current and frequency. Each node in the network (i.e. an electrical power control apparatus as described herein) does not need to know the makeup, state or requirements of the remainder of the network. By real time monitoring of its input and output, and following a specific rule set for the known information, it can act upon its controllable input/output as needed.

Within the network, the output of each node forms the input of another. As each node directly controls its output, this output provides the input to the next node. Using the power waveform itself as an information source removes any need for additional communications and information systems. All of the required information is available at the location that requires it as an input at the time that it is required.

Secondary Communications

Existing technology makes it possible to send data encoded over operational power cables. This is done by transmitting the data at a frequency much higher than the power waveform. As power wiring is unshielded and untwisted, the wire itself acts as an antenna and can emit radio waves at the frequency used. In jurisdictions where limited-power wide-band signals can be injected into unshielded wiring (for example the U.S.), this technology can be used to send information between electrical power control apparatuses. This data can include status information such as device health and statistics. In addition, information can be communicated between electrical power control apparatuses that are not directly connected via power wires.

Choice Machines

The electrical power control apparatuses operating within the electrical power supply network operate as choice machines within the network. The concept of a choice machine as defined by Alan Turing is where operation of the machine can only be partially determined by the configuration.

The electrical power supply network is a complex open system as external factors directly affect the system state, namely the generation and consumption of power in and out of the system. Each of these points within the system acts as an external agent, making choices which directly affect the system state. These choices take many forms, including human decisions or environmental variables (sunlight or wind affecting generation). Within the electrical power supply network, each of these generation and consumption agents is an electrical power control apparatus acting within the system as a choice machine. It is connected to the other electrical power control apparatuses as described herein, which also act as choice machines, reacting to each other.

Electricity Network Implementation

Overview

The network described herein constitutes a systemic, distributed and autonomous meta-network for electricity.

This is not a definition that existing electricity networks can meet. It consists of the following components in a distributed peer to peer configuration:

Many power sources;
Many electrical power control apparatuses (or 'nodes') to modulate the power waveform throughout the network;
Many loads; and
Electrical conductors connecting the above components to allow power flow.

The network provides short term balancing of system voltage and frequency in the electricity grid to maintain an optimum power factor and minimise energy losses due to inefficient operations and introduced noise, instability, and events. The network adapts to every change in supply or demand, and the resulting balance is propagated throughout the network at a rate faster than existing electricity networks can be balanced using traditional control methodologies and dispatchable generation. This provides the capacity for much higher levels of distributed, volatile asynchronous generation within the system without network inefficiencies and failure.

Architecture

Figure 40:
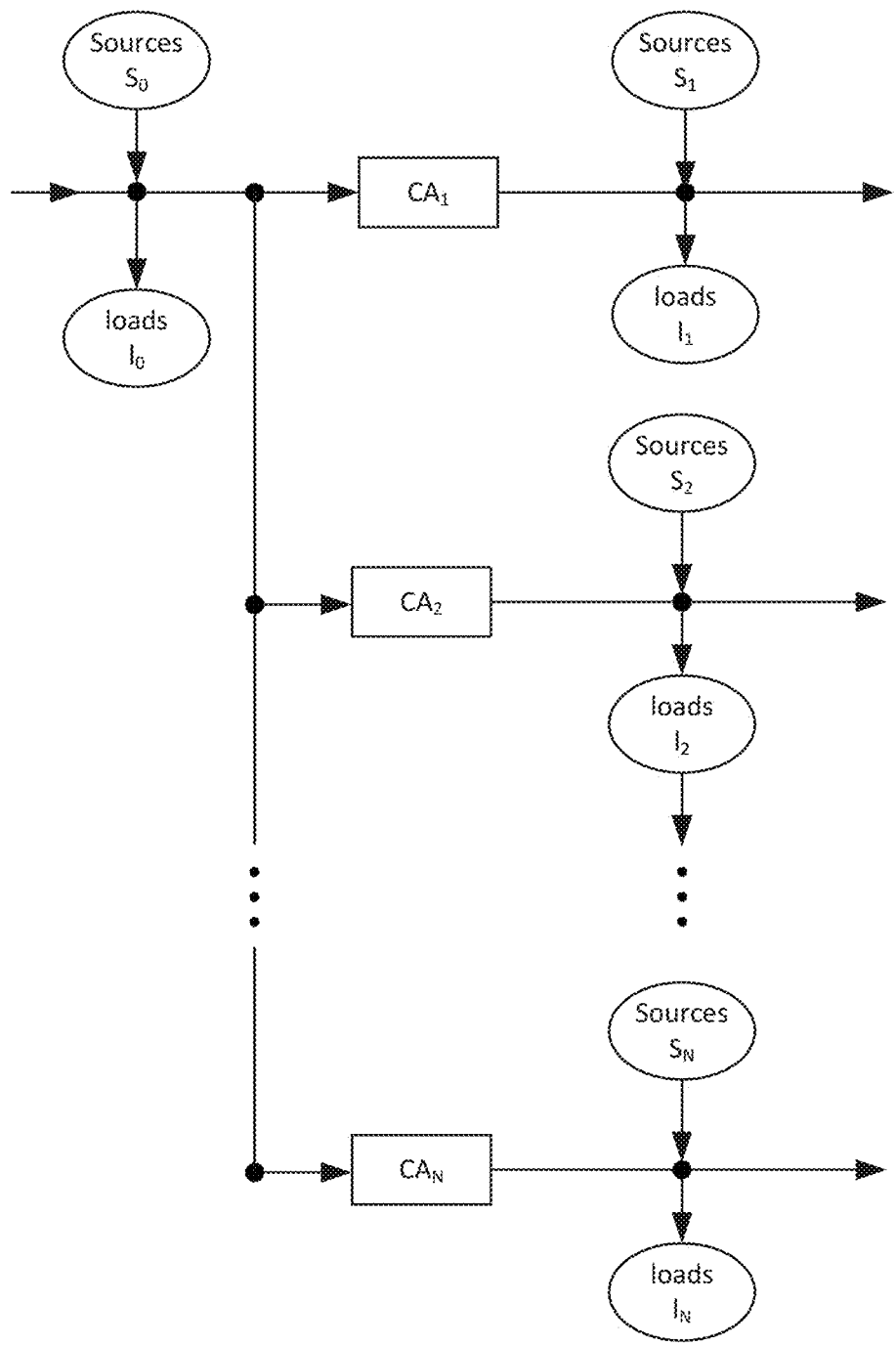
FIG. 40 is a block diagram of an electrical power distribution network in accordance with some embodiments of the present invention.

FIG. 40 is a block diagram of a generalised portion of an electrical power distribution network in accordance with the present invention. With power flowing generally from left to right in this Figure, input power from a corresponding one of the electrical power control apparatuses (not shown) and is coupled to at least one of:

(i) one or more corresponding sources s0;
(ii) one or more corresponding loads l0; and
(iii) one or more corresponding further electrical power control apparatuses $CA_1, \ldots CA_N$.

That is, only one of items (i) to (iii) is required to be present in the general case.

Each of the one or more electrical power control apparatuses $CA_1, \ldots CA_N$, if present, controls its corresponding output as described herein, and that output is similarly coupled to a corresponding input of another portion of the network having the same general configuration shown in FIG. 40 until the rightmost edge of the network is reached, in which case the output is coupled to one or more loads and optionally and/or one or more sources. Similarly, at the leftmost edge of the network there is no input coming from the left direction, and the one or more corresponding sources $S_0$ are the only source of power. Accordingly, the generalised portion of the network shown in FIG. 40 can be considered a building block of the network, with any practical number of these building blocks being present to form the network by interconnecting them so that the N outputs on the right-hand side and coupled to corresponding inputs of other instances of the building block.

The resulting network is a self-managing peer to peer electricity network. It meets the requirements of electricity distribution with any combination of geographic constraints and generation and consumption profiles.

The behaviour of the network derives from the behaviour of the electrical power control apparatuses within it, and provides efficient bi-directional distribution of electricity subject to the physical constraints of the network. Where the network is implemented in a Greenfield location, it can be designed based on the nature of the required power generation and supply distribution and profiles.

Operational Effects

Stability

The network provides dynamic modulation of the system frequency at each node/electrical power control apparatus. This makes the network more resilient to the nature of generation input, as, unless prior art networks, it does not rely on synchronous generation to introduce stored inertial energy to provide short-term mitigation of frequency changes through self-regulation of load balancing. Instead, the network described herein acts as a distributed system with its own inertia to frequency change, a direct network effect of the electrical power control apparatuses distributed throughout the network actively modulating the system frequency to maintain efficiency.

This inertia allows the network to handle an increased level of asynchronous generation such as solar and wind, with little effect on the short term (millisecond to second) frequency stability of the network.

Efficiency

The network has improved efficiency under a much wider range of operating conditions compared to prior art electrical network architectures. This efficiency gain significantly increases as the level of volatility (short term variability in generation and/or consumption) increases.

Any electrical network needs to maintain the power flow within a narrow band of operation due to the requirements of consumption loads. The network described herein continuously and dynamically modulates the electrical waveform through the use of the electrical power control apparatuses described herein to maintain the waveform close to peak efficiency. This avoids periods of sub-optimal network utilisation which arise under other network management configurations, as well as avoiding the introduction of switching events into the power network (which arise from waiting for the network to degrade to a predetermined efficiency limit before initiating corrective action) which must be compensated for and filtered.

Additionally, by maintaining an improved power factor, network equipment can be sized for a smaller band of operation (poor power factor requires oversizing of equipment for a given power output), leading to improved efficiency through lower relative transmission and distribution losses.

Greenfield Implementation

When implementing a new electrical power supply network as described herein with no existing equipment to integrate and re-use, the network will consist of electrical power control apparatuses and standard electrical network infrastructure components, as described below.

Electrical Infrastructure Components

These components transmit power from point to point as required and can be designed for the most efficient arrangement possible within the constraints of how the network operates and the predicted energy usage at corresponding physical locations where power is consumed. As the power flow is maintained with improved transient response, the conducting equipment can be sized appropriately to reduce resistive losses in the network.

Existing electrical equipment that is used in networks for reasons other than directly affecting the voltage, frequency and power factor (i.e., circuit breakers, isolators etc.) can also be used.

Electrical Power Control Apparatuses

These maintain voltage and frequency stability and are typically distributed throughout the network. The locations of the electrical power control apparatuses can be chosen to provide the most efficient and reliable maintaining of power flow within the network. In particular, an electrical power control apparatus can be located at each point where power is injected or drawn from the grid, or any other point where the properties of power flow change within the network, including changes in distribution voltage.

FIG. 41 is a circuit diagram of one embodiment of an electrical power control apparatus. In this embodiment, the electrical power control apparatus includes a single-phase shell-type variable air gap transformer (VAGT), with a primary winding of N1 turns wound around the central leg, and a secondary winding wound around all three legs of the transformer. The main section of the secondary winding of N2 turns is wound around the central leg, with additional windings on the left leg in the same winding direction as the central leg, and the windings on the right leg in the opposing direction. Both the left and the right leg have the same number of turns. Because the core is symmetrical, when there is no control the flux is evenly split between the two pathways, and the windings on the left and right leg cancel each other out and have zero effect on the device. The ratio of N1 and N2 turns gives the ratio of the voltage conversion.

The control of the device is achieved using two control windings. These two windings are wound in opposing directions of Nc turns each. When current passes through these control windings, the reluctances of the two halves of the main flux paths are correspondingly modified, changing the proportion of the magnetic flux flowing through each one. Because the two control windings are in opposing directions, the net effect on the circuit is zero.

When the flux is not evenly flowing through both halves of the transformer, the balance of the left and right leg windings is altered, thereby modifying the effective ratio of N1 and N2, and thus the voltage conversion. If more flux flows through the left leg, then N2 increases. Conversely, if more flux flows through the right leg, then N2 decreases. This change in ratio provides the ability to control the output voltage V2 (the voltage on the secondary winding) independently of V1 (the voltage on the primary winding).

This electrical power control apparatus is used to control three things: output voltage, input power factor, and the profile (i.e. waveform) of the output voltage. In the described embodiment, the control is achieved using a phase locked loop (PLL) and a Park transform, both of which are standard signal processing methods known to those skilled in the art.

A phase locked loop is a standard electronics building block that is used to lock two signals to the same frequency, as described at http://www.radio-electronics.com/info/rf-technology-design/pll-synthesizers/phase-locked-loop-tutorial.php, for example. A PLL can be implemented in hardware or software, as described at http://www.ti.com/lit/an/sprabt3a/sprabt3a.pdf for a software implementation, and http://www.ti.com/product/lmx2594 for a hardware implementation.

However, in the embodiment shown in FIG. 41, the PLL and other control processes of the electrical power control apparatus (including the power factor and voltage control processes described herein) are implemented as configuration data of a field-programmable gate array (FPGA), as described at https://www.xilinx.com/products/silicon-devices/fpga/kintex-7.html, that is coupled to voltage sensors (such as those described at http://www.eaton.com/Eaton/ProductsServices/Electrical/ProductsandServices/AutomationandControl/SensorsLimitSwitches/PowerSensors/VoltageSensors/index.htm#tabs-1) and current sensors (such as those described at http://uk.rs-online.com/web/p/current-transducers/7157970/).

The Park Transform is used to convert vectors in the ABC reference frame to the DQZ reference frame (direct axis, quadratic axis, and zero sequence), transforming orthogonal stationary reference frame quantities into rotating reference frame quantities. The Park Transformation is generally expressed by the following equations:

$$Vd = V\alpha*\cos(\theta) + V\beta*\sin(\theta)$$

$$Vq = V\beta*\cos(\theta) - V\alpha*\sin(\theta)$$

where,
Vd, Vq are rotating reference frame quantities
Vα, Vβ are orthogonal stationary reference frame quantities
θ is the rotation angle An Inverse Park Transform transforms quantities in rotating reference frame to orthogonal stationary reference frame. The Inverse Park Transformation is generally expressed by the following equations:

$$V\alpha = Vd*\cos(\theta) - Vq*\sin(\theta)$$

$$V\beta = Vq*\cos(\theta) + Vd-\sin(\theta)$$

where,
Vα, Vβ are orthogonal stationary reference frame quantities
Vd, Vq are rotating reference frame quantities
θ is the rotation angle This is a mathematical function that can be directly coded into the control system software, and is available as a function block in software development packages such as Matlab as described at http://www.ti.com/lit/an/bpra048/bpra048.pdf and https://uk.mathworks.com/help/physmod/sps/powersys/ref/abctodq0dq0toabc.html.

Output Voltage Control

Figure 42:
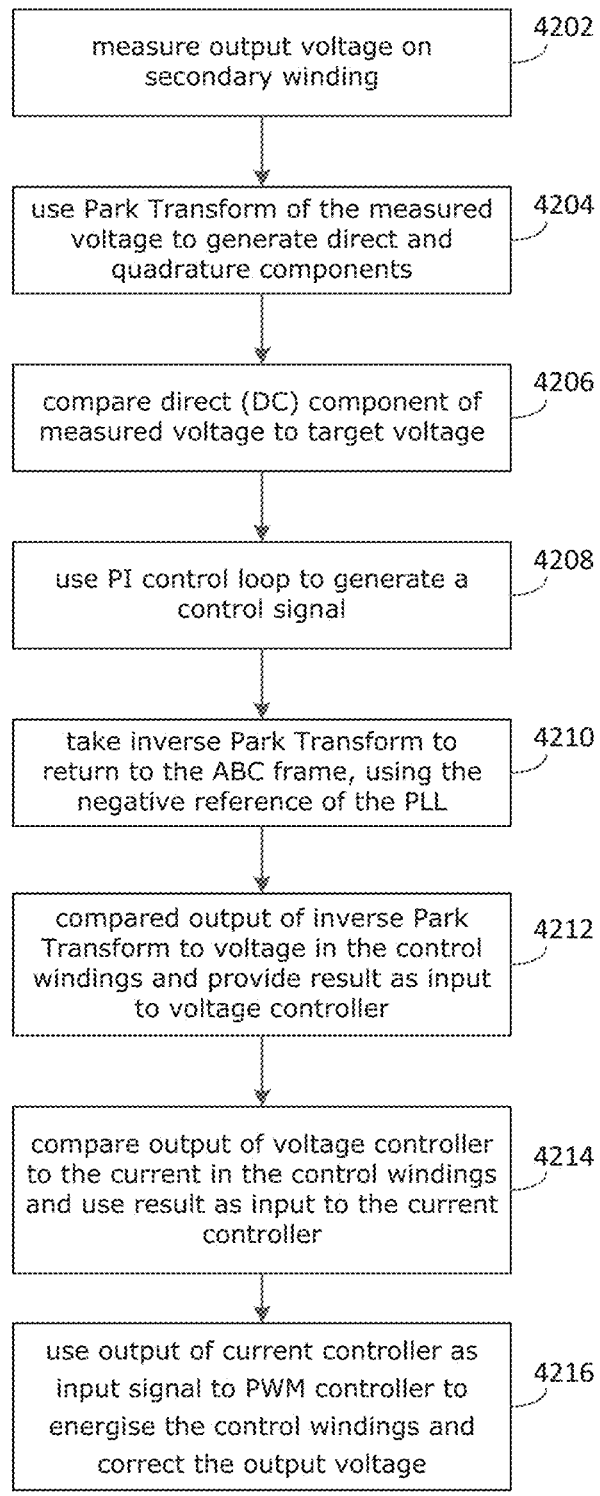
FIG. 42 is a flow diagram of a voltage control process of the electrical power control apparatus of FIG. 41.

The electrical power control apparatus controls its output voltage by executing a voltage control process, as shown in FIG. 42. The process begins at step 4202 by measuring the output voltage on the secondary winding. At step 4204, a Park Transform of the measured voltage is taken to generate the direct and quadrature components. The PLL provides a reference phase angle to this Park Transform within the control system, as well as all others, ensuring that all calculations are taken with the same time and phase value. The PLL is calculated with reference to the voltage measurement taken on the primary coil (Supply Voltage V1).

At step 4206, the direct (i.e., DC) component of the measured voltage is compared to a reference voltage of V2 demand, being the desired or target voltage set-point. At step 4208, a PI (proportional-integral) control loop is used to generate a control signal using the error between V2 Demand (i.e. target output voltage) and the measured output voltage on the secondary winding (i.e. Load V2).

At step 4210, an inverse Park Transform of the control signal is taken to return to the ABC frame, using the phase angle reference of the PLL.

At step 4212, the output of the inverse Park Transform is compared to the voltage in the control windings, and the difference is used as the input to the voltage control loop, in this embodiment being a PI control loop.

At step 4214, the output of the voltage control loop is compared to the current in the control windings, and the difference is used as the input to the current control loop, in this embodiment being a PI control loop.

At step 4216, the output of the current control loop is used to generate power supplied to the control windings to correct the output voltage. In the described embodiment, this is achieved by using the output of the current controller as the input signal to a Pulse Width Modulation (PWM) controller. This PWM activates IGBTs (insulated-gate bipolar transistors) within a two channel full bridge inverter circuit, which provides the power to the two control windings.

Power Factor (PF) Control

Figure 43:
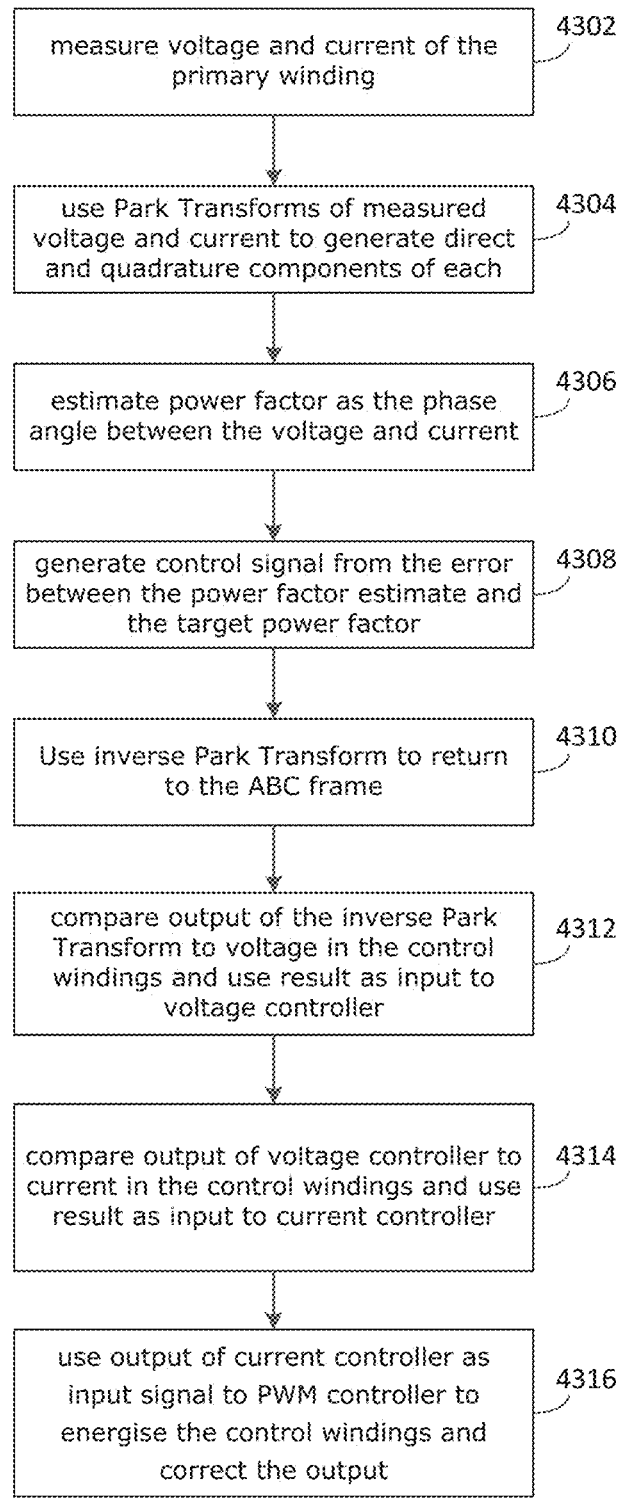
FIG. 43 is a flow diagram of a power factor control process of the electrical power control apparatus of FIG. 41.

The electrical power control apparatus controls its output voltage by executing a power factor control process, as shown in FIG. 43. The process begins at step 4302 by measuring both the voltage and the current of the primary winding. At step 4304, Park Transforms of the measured voltage and current are taken to generate the direct and quadrature components of each. This transform is taken with reference to the PLL that is measured using the voltage of the primary coil (the supply voltage V1).

At step 4306, the power factor (PF) is estimated. This can be done in a number of ways, the simplest being the phase angle between the voltage and the current. The aim of power factor control is to control the reactive power on the primary winding to zero. The apparent power has two components: real power and reactive power. The objective is for the apparent power delivered at the output of the apparatus to be as close to the real power as possible (the power factor being the ratio of real power to apparent power), meaning the reactive power will be zero and the power factor will be 1.

At step 4308, the error between the power factor estimate and the target PF (i.e., reactive power=0) is used by a PI control loop to generate a control signal.

At step 4310, an inverse Park Transform of the control signal is taken to return to the ABC frame, using the phase angle reference of the PLL.

At step 4312, the output of the inverse Park Transform is compared to the voltage in the control windings and the result is used as the input to the voltage control loop, a PI control loop.

At step 4314, the output of the voltage control loop is compared to the current in the control windings and the result is used as the input to the current control loop, a PI control loop.

At step 4316, the output of the current control loop is used to generate power supplied to the control windings to optimise or at least improve the power factor of the device. In the described embodiment, this is achieved by using the output of the current controller as the input signal to a Pulse Width Modulation (PWM) controller. This PWM activates IGBTs (insulated-gate bipolar transistors) within a two channel full bridge inverter circuit, which provides the power to the two control windings.

Grid Control

Using secondary communications as described above, data is sent over the power lines between electrical power control apparatuses, and the information represented by the data can be used to vary the tuning and performance characteristics of the electrical power control apparatuses. The reason for this is the optimum performance of any single one of the electrical power control apparatuses might not be the best possible action for the network as a whole. As an example, it may be required to reduce the power going downstream from an electrical power control apparatus slightly to help ease a power shortage elsewhere within the network, or vice versa (increasing the power going downstream to help free up network capacity and reduce the likelihood of an overvoltage trip).

The three parameters which can be modified to affect the electrical power control apparatus performance in the embodiment shown in FIG. 41 are:
(i) PLL, which provides the phase to all of the Park Transforms and allows frequency to be varied;
(ii) Qref, which is the PF control demand; and
(iii) V2 demand, which is the target output voltage.

Brownfield Implementation

The following outlines an equipment summary for changeover of an existing electricity network to the network described herein. As each node/electrical power control apparatus of the network is autonomous, individual nodes can operate within an existing electricity network individually and with no additional infrastructure, allowing staged rollouts thereby minimising risk and delivering incremental benefits.

Each electrical power control apparatuses directly replaces a transformer within the electricity network. It is a drop in replacement, utilising the same physical electricity network connections, and providing all of the functionality of the transformer, plus the additional functionality described herein.

No additional information systems, networks, or any other electrical apparatuses are required. The network utilises traditional electrical conduction infrastructure to transfer electricity. When adapting an electrical network the existing wires can be reused, minimising the amount of new infrastructure that needs to be installed.

The network described herein makes redundant a number of existing technologies that are currently required in electricity networks for conditioning and stabilisation. This is due to the electrical power control apparatuses within the network finely controlling the power flow in such a way that additional corrective actions to voltage, frequency and power factor are not required. This includes network components such as frequency converters, power factor compensators, and harmonic filters. This makes the network more robust than prior art electricity networks (due to the reduction in failure points and failure modes), cheaper to build and maintain, and more efficient.

Use Case Example

Figure 39:
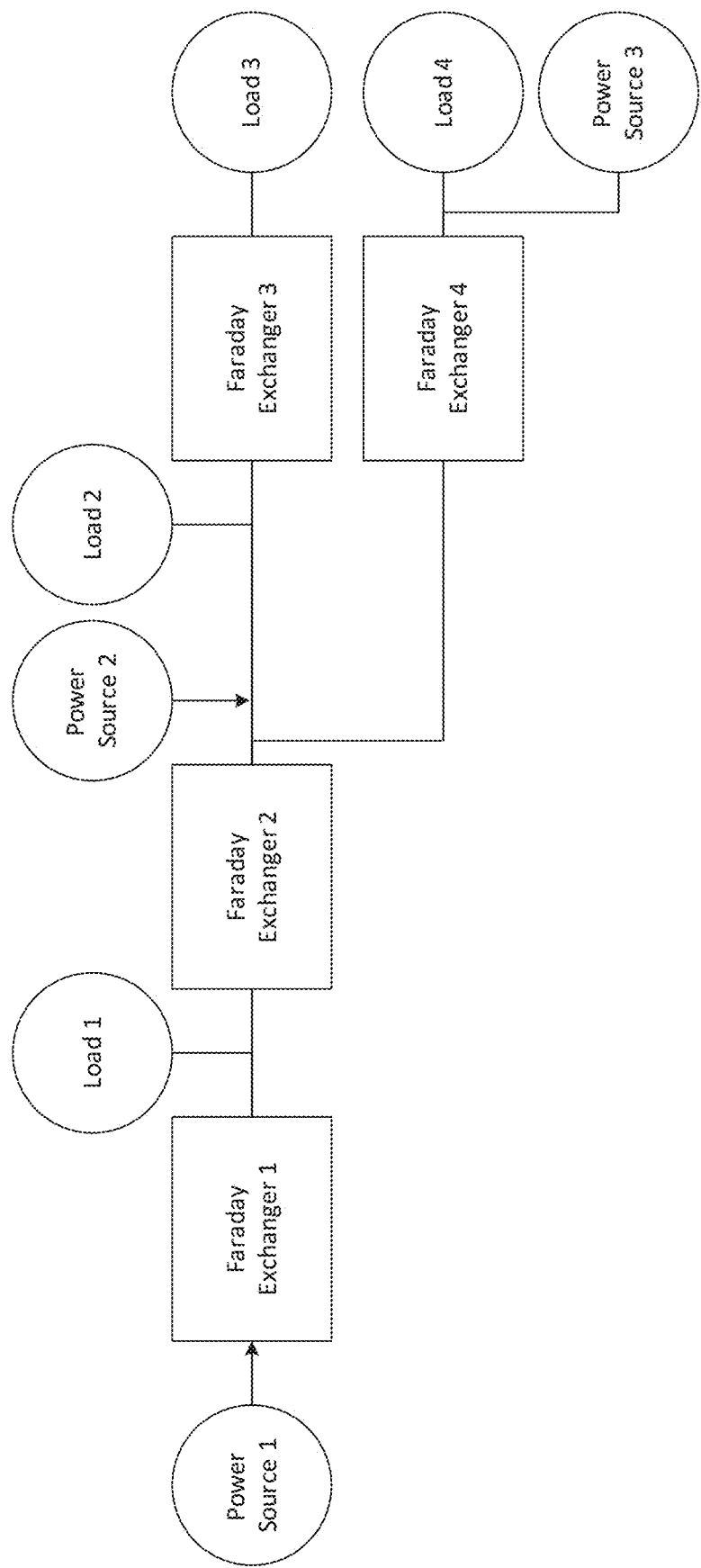
FIG. 39 is a simplified block diagram illustrating how the devices may be arranged within a power supply network to modulate and balance the power flow throughout the network.

Each electrical power control apparatus in the network operates as described herein to control the power flow through itself at an individual level. Leveraging that individual behaviour which keeps power at the desired target levels, the following explains how power flow is controlled at a network level, with reference to FIG. 39.
1. Each Apparatus within the network measures the power at its input and output through the instantaneous voltage and current. The Apparatus will control its operation to maintain optimal productivity;
    a. If the output power drops and becomes lower than the input power, the Apparatus compensates using its control and the excess power will be stored within the Apparatus;
    b. If the output power increases and becomes higher than the input power, the Apparatus will compensate using its control, if there is excess power stored within the device this will be the initial source of compensation, with the secondary source of compensation being provided by the Apparatus control as described herein;
2. Each Power Source will see the state of the network at its location, and if it has a Apparatus as its direct connection to the network will control its input into the network based on this information;
3. Each Load within the network will operate as it desires. If the network remains in a steady state, the following outlines how a dynamic response will occur:
1. Case: Load 3 increases:
    a. Apparatus 3 detects the increase on its output and compensates with internal storage;

b. Once internal storage is depleted Apparatus 3 input side local network sees the increase in load;
c. The following occurs in parallel;
  i. Apparatus 2 sees increased load and compensates with internal storage;
  ii. Power Source 2 sees increased load and responds if power is available;
  iii. Apparatus 4 sees increased load and if Power Source 3 is greater than Load 4, Apparatus 4 can respond with power;
d. Once internal storage is depleted Apparatus 2 input side local network sees the increase in load;
e. Apparatus 1 sees increased load and compensates with internal storage;
f. Once internal storage is depleted Apparatus 1 input side local network sees the increase in load.

Using the same logical approach, the case for the increase or decrease of any power source or load within the network can be described, including its flow-on effects throughout the network.

It will be apparent to those skilled in the art that the electrical power distribution network described herein is only capable of compensating and addressing short term and relatively minor fluctuations in power flow. In particular, intermittence of supply and other major disturbances cannot be counteracted using this system.

Many modifications will be apparent to those skilled in the art without departing from the scope of the present invention.

The invention claimed is:

1. An electrical power distribution network, including:
a plurality of electrical power control apparatuses, each of the plurality of electrical power control apparatuses including:
an input configured to receive input electric power in a form of an input signal having a time-varying input fundamental frequency and a time-varying input characteristic voltage;
an output configured to provide output electric power in a form of an output signal having a corresponding output fundamental frequency and a corresponding output characteristic voltage;
a controller configured to generate control signals, and one or more signal conversion components configured to generate the output signal from the input signal and in dependence on the control signals;
wherein the controller is configured to dynamically generate the control signals in dependence on the time-varying input fundamental frequency and the time-varying input characteristic voltage so as to dynamically control generation of the output signal and maintain the output voltage and the output frequency at target values;
electrical power generation components configured to act as sources of electrical power to at least a first subset of the electrical power control apparatuses; and
electrical power consumption components configured to act as sinks of electrical power from at least a second subset of the electrical power control apparatuses;
wherein each of the electrical power control apparatuses is configured to operate autonomously from the other electrical power control apparatuses of the plurality of electrical power control apparatuses, and wherein some of the electrical power control apparatuses are edge apparatuses that are located at edges of the electrical power distribution network, the other electrical power control apparatuses are intermediate apparatuses being intermediate to the edge apparatuses and interconnected in a series configuration chain such that the output of each of the intermediate apparatuses is configured to be connected to the input of a next electrical power control apparatus in the series configuration chain and an output of each of at least a third subset of the electrical power control apparatuses is configured to be connected to at least one of:
(i) one or more of the sinks and
(ii) one or more of the sources of electrical power,
wherein the electrical power control apparatuses are configured to dynamically and collectively maintain voltages and frequencies of electric power signals flowing through the electrical power distribution network at target values to compensate for variations in at least one of:
(i) the one or more of the sinks and
(ii) the one or more of the sources of electrical power.

2. The electrical power distribution network of claim 1, wherein each of the electrical power control apparatuses includes one or more energy storage components storing electrical energy, and is configured to use its energy storage components to store electrical energy when it receives more electrical power than is required at its output, and configured to release stored electrical energy from its energy storage components when it receives less electrical power than is required at its output, and configured to provide corresponding output electrical power in the form of a corresponding output signal having a target output frequency and a target output voltage.

3. The electrical power distribution network of claim 1, wherein each of the electrical power control apparatuses includes:
at least one virtual air gap transformer, including at least one primary winding, at least one secondary winding, and one or more control windings configured to control electromagnetic coupling between the primary winding and the at least one secondary winding;
an input port configured to receive the input signal and a control component configured:
to receive a signal representing the input voltage and the input fundamental frequency of the input signal, and to generate a corresponding virtual air gap control signal to determine the electrical current in the control windings of the at least one virtual air gap transformer, such that a target output voltage of a target output frequency is generated at the secondary windings.

4. The electrical power distribution network of claim 3, wherein the control component is configured to control the electrical current in the control windings of the at least one virtual air gap transformer to improve the power factor of the electrical power control apparatus, wherein the control component includes a field-programmable gate array (FPGA) or other form of processor configured to implement:
a phase-locked loop (PLL) to determine a phase of the corresponding input signal;
at least one Park transform component to generate Park transforms representations of voltage and current of the input signal based on the phase determined by the PLL;
a reactive power estimation component configured to process the voltage and current of the input signal to generate an estimate of reactive power; and
one or more power factor control components configured to process the estimate of reactive power to control the electrical current in the control windings of the at least one virtual air gap transformer to improve the power factor of the electrical power control apparatus.

5. The electrical power distribution network of claim 3, wherein each of the electrical power control apparatuses is configured for bi-directional use such that the apparatus is configured to receive second input electrical energy in the form of a second input signal having a second input fundamental frequency and a second input voltage, and configured to generate corresponding output electrical energy in the form of a corresponding second output signal of a second target frequency and a second target output voltage, wherein the second input signal or a corresponding signal derived from the second input signal is applied to the secondary winding of the at least one virtual air gap transformer to generate a corresponding signal having the second target output voltage at the primary winding of the virtual air gap transformer.

6. The electrical power distribution network of claim 3, wherein the at least one virtual air gap transformer includes two virtual air gap transformers connected in series by at least one loop configured to store energy.

7. The electrical power distribution network of claim 3, wherein at least one of the target output frequency and the target output voltage varies over time.

8. The electrical power distribution network of claim 1, wherein each of the electrical power control apparatuses includes:
- at least one virtual air gap transformer, including at least one primary winding, at least one secondary winding, and at least one control winding configured to control electromagnetic coupling between the primary winding and the at least one secondary winding;
- a heterodyning component configured to receive a signal having a first fundamental frequency and to generate a corresponding heterodyned signal having frequency components corresponding to a sum and a difference of the first fundamental frequency and a reference frequency;
- a filtering component configured to filter a heterodyned signal to remove one of the sum and the difference frequency components therefrom and provide a corresponding filtered heterodyned signal;
- an input port configured to receive the input signal; and
- wherein the controller is further configured to configured to:
  (i) receive a signal representing at least the first fundamental frequency of the first input signal and to generate a corresponding frequency control signal to determine the reference frequency of the heterodyning component such that the filtered signal has a target output frequency; and
  (ii) receive a signal representing the first voltage, and to generate a corresponding virtual air gap control signal to determine the electrical current in the at least one control winding of the at least one virtual air gap transformer, such that a target output voltage is generated at the at least one secondary winding.

9. The electrical power distribution network of claim 8, wherein each of the electrical power control apparatuses is configured for bi-directional use such that the apparatus is configured to receive second input electrical energy in the form of a second input signal having a second input fundamental frequency and a second input voltage, and configured to generate corresponding output electrical energy in the form of a corresponding second output signal of a second target frequency and a second target output voltage, wherein the second input signal or a corresponding signal derived from the second input signal is applied to the secondary winding of the at least one virtual air gap transformer to generate a corresponding signal having the second target output voltage at the primary winding of the virtual air gap transformer.

10. The electrical power distribution network of claim 8, wherein each of the electric power control apparatuses is configured such that the second input signal or a corresponding signal derived from the second input signal is received by the heterodyning component to generate a corresponding second heterodyned signal having second frequency components corresponding to a sum and a difference of the second fundamental frequency and a reference frequency, and the filtering component is configured to filter the second heterodyned signal to remove one of the sum and the difference frequency components therefrom and provide a corresponding second filtered signal.

11. The electrical power distribution network of claim 8, wherein the heterodyning component is a first heterodyning component, the filtering component is a first filtering component, and the system includes a second heterodyning component and a second filtering component, wherein the first heterodyning component and the first filtering component are configured to process signals flowing through the apparatus along a first pathway, and the second heterodyning component and the second filtering component are configured to process signals flowing through the apparatus along a second pathway generally opposite in sense to the first pathway.

12. The electrical power distribution network of claim 8, wherein the heterodyning component is a first heterodyning component, the filtering component is a first filtering component, and the apparatus includes a second heterodyning component and a second filtering component, wherein the heterodyning components and the filtering components are configured such that the input signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

13. An electrical power distribution process executed by each electrical power control apparatus of the plurality of electrical power control apparatuses of claim 1, the process including:
- receiving electrical power in the form of the corresponding input signal having the time-varying input fundamental frequency and the time-varying input characteristic voltage, the electrical power representing an output of at least one other of the electrical power control apparatuses as modified by at least one of:
  (i) one or more of the sinks; and
  (ii) one or more of the sources of electrical power;
- controlling the one or more signal conversion components so that the electrical power control apparatus provides output electrical energy in the form of the output signal having corresponding target values of voltage and frequency;
- storing electrical energy in one or more corresponding energy storage components when the electrical power control apparatus receives more electrical power than is required at its output;
- releasing stored electrical energy from the one or more corresponding energy storage components when the electrical power control apparatus receives less electrical power than is required at its output; and providing corresponding output electrical power in the form of a corresponding output signal having a target output frequency and a target output voltage.

14. The electrical power distribution process of claim 13, including controlling the one or more signal conversion components to improve the power factor of the electrical power control apparatus.

15. The electrical power distribution process of claim 13, including:

measuring an output voltage on a secondary winding of a variable air-gap transformer of the electrical power control apparatus;

applying a Park transform of the measured voltage to generate direct and quadrature components of the measured voltage;

comparing the direct component to the target voltage value;

using a proportional-integral control loop to generate a control signal;

applying an inverse Park transform to the control signal to generate a transformed control signal; and based on a comparison of the transformed control signal and electrical current in the control windings of at least one virtual air gap transformer, adjusting the electrical current in the control windings to improve the power factor of the electrical power control apparatus.

16. The electrical power distribution network of claim 1, wherein at least two of the first, second, and third subsets of the electrical power control apparatuses are the same subset.

\* \* \* \* \*